(12) United States Patent
Shirahata et al.

(10) Patent No.: US 11,475,284 B2
(45) Date of Patent: Oct. 18, 2022

(54) INFORMATION PROCESSING APPARATUS, NEURAL NETWORK PROGRAM, AND PROCESSING METHOD FOR NEURAL NETWORK

(71) Applicant: FUJITSU LIMITED, Kawasaki (JP)

(72) Inventors: Koichi Shirahata, Yokohama (JP); Takashi Arakawa, Numazu (JP); Katsuhiro Yoda, Kodaira (JP); Makiko Ito, Kawasaki (JP); Yasumoto Tomita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 551 days.

(21) Appl. No.: 16/709,962

(22) Filed: Dec. 11, 2019

(65) Prior Publication Data

US 2020/0202201 A1    Jun. 25, 2020

(30) Foreign Application Priority Data

Dec. 21, 2018  (JP) .............................. JP2018-239640

(51) Int. Cl.
  *G06K 9/00*   (2022.01)
  *G06N 3/063*  (2006.01)
  (Continued)

(52) U.S. Cl.
  CPC .............. *G06N 3/063* (2013.01); *G06N 3/04* (2013.01); *G06N 3/08* (2013.01)

(58) Field of Classification Search
  CPC ........... G06N 3/063; G06N 3/04; G06N 3/08; G06N 3/0454; G06N 3/0481; G06N 3/082; G06N 3/084
  See application file for complete search history.

(56) References Cited

U.S. PATENT DOCUMENTS

| 2011/0078378 | A1* | 3/2011 | Suzuki | ................ G06F 9/44557 |
|   |   |   |   | 711/E12.001 |
| 2019/0196887 | A1* | 6/2019 | Yoda | ................... G06F 12/0842 |
| 2019/0324856 | A1* | 10/2019 | Zhao | ......................... G06T 1/20 |

FOREIGN PATENT DOCUMENTS

| EP | 2908241 A2 | 8/2015 |
| EP | 3035249 A1 | 6/2016 |

(Continued)

OTHER PUBLICATIONS

Extended European Search Report dated May 15, 2020 for corresponding European Patent Application No. 19212664.7, 10 pages.

(Continued)

*Primary Examiner* — Dhaval V Patel
(74) *Attorney, Agent, or Firm* — Fujitsu Patent Center

(57) ABSTRACT

An information processing apparatus includes a processor including a first operation circuit that executes a product-sum operation, a second operation circuit that executes a certain operation, and a resister. The processor executes a first operation including the certain operation in a first layer in a neural network. The processor executes the first operation by a second method of calculating the certain operation by the second operation circuit, in a case where second operation time necessary for the first operation when the certain operation is executed by the second operation circuit is less than memory transfer time. Or the processor executes the first operation by a first method of calculating the certain operation by an approximate calculation by the first operation circuit, in a case where first operation time necessary for the first operation when executed by the first method is less than the memory transfer time.

9 Claims, 39 Drawing Sheets

(51) Int. Cl.
    *G06N 3/04*     (2006.01)
    *G06N 3/08*     (2006.01)

(56) References Cited

FOREIGN PATENT DOCUMENTS

| JP | 6-215021 | 8/1994 |
| JP | 2005-275626 | 10/2005 |

OTHER PUBLICATIONS

Wang, Ying et al., "Real-Time Meets Approximate Computing: An Elastic CNN Inference Accelerator with Adaptive Trade-off between QoS and QoR", 2017 54th ACM/EDAC/IEEE Design Automation Conference (DAC), IEEE, Jun. 18, 2017, 6 pages, XP033162324.
Alex Krizhevsky, et al., "ImageNet Classification with Deep Convolutional Neural Networks", retrieved from: https://papers.nips.cc/paper/4824-imagenet-classification-with-deep-convolutional-neural-networks.pdf.

* cited by examiner

FIG. 8

| LAYER | SPECIAL OPERATION |
|---|---|
| CONV. | NONE |
| MAX_POOLING | NONE |
| ReLU | NONE |
| FUL_CNCT | NONE |
| DROPOUT | NONE |
| SOFTMAX | POWER: $e^x$ |
| LRN | POWER OF -3/4 AND DIVISION: $(1+(\alpha/n)\Sigma_i x_i^2)^{-3/4}$ |
| BATCH_NORM | POWER OF -1/2: $\sqrt{X}$ |
| LSTM | sigmoid, tanh |

FIG. 17

| CONVOLUTION | |
|---|---|
| OPERATION CONTENT | $O(j) = \Sigma w_{ij} \times I(i) + bias$ (EXECUTE OPERATION OF MULTIPLYING ELEMENTS OF ALL INPUT CHANNELS $C_{in}$ OF PADDED INPUT IMAGES BY WEIGHT OF FILTERS THAT ARE $kH \times kW \times C_{in}$ AND ADDING BIAS bias THERETO FOR FILTERS FOR ALL OUTPUT CHANNELS $C_{out}$) |
| INPUT IMAGE SIZE | $H_{in} \times W_{in}$ |
| AMOUNT OF PADDING | pad |
| NUMBER OF CHANNELS FOR INPUT | $C_{in}$ |
| FILTER IMAGE SIZE | $kH \times kW \times C_{in}$ |
| NUMBER OF STRIDES | St (MOVEMENT WIDTH OF FILTER) |
| OUTPUT IMAGE SIZE | $H_{out} \times W_{out} \times C_{out}$ ($C_{out}$ IS OUTPUT CHANNEL) |
| $W_{out}$, $H_{out}$ | $W_{out} = (W_{in} + 2pad - kW)/St - 1$ or $W_{in} = W_{out} \times S + kW + St - 2pad$<br>$H_{out} = (H_{in} + 2pad - kH)/St - 1$ or $H_{in} = H_{out} \times S + kH + St - 2pad$ |
| NUMBER OF OPERATIONS | NUMBER OF OPERATIONS (PRODUCT) = $(H_{out} \times W_{out} \times C_{out} \div Gr \times kH \times kW \times C_{in} \div Gr) \times Gr \times MB$<br>NUMBER OF OPERATIONS (SUM) = $\{(H_{out} \times W_{out} \times C_{out} \div Gr \times kH \times kW \times C_{in} \div Gr \times Gr) + H_{out} \times W_{out} \times C_{out}\} \times MB$ |
| NUMBER OF INSTRUCTIONS OF OPERATION UNIT | NUMBER OF INSTRUCTIONS (PRODUCT SUM) = $(H_{out} \times W_{out} \times C_{out} \div Gr \times kH \times kW \times C_{in} \div Gr) \times Gr \times MB$<br>NUMBER OF INSTRUCTIONS (SUM) = NUMBER OF OPERATIONS (SUM) - NUMBER OF INSTRUCTIONS (PRODUCT SUM) = $H_{out} \times W_{out} \times C_{out} \times MB$<br>NUMBER OF INSTRUCTIONS (PRODUCT) = NUMBER OF OPERATIONS (PRODUCT) - NUMBER OF INSTRUCTIONS (PRODUCT SUM) = 0 |
| AMOUNT OF DATA | bottom = $H_{in} \times W_{in} \times C_{in} \times MB$<br>top = $H_{out} \times W_{out} \times C_{out} \times MB$<br>bias = $C_{out}$<br>weight = $kH \times kW \times Cin \div Gr \times C_{out} \div Gr \times Gr$ |

FIG. 19

| | Max Pooling |
|---|---|
| OPERATION CONTENT | $O(i)$=MAXIMUM VALUE OF $I(i)$ IN $kH \times kW$ (FOR EACH OUTPUT $O(i)$, COMPARE A NUMBER OF $kH \times kW$ INPUTS $I(i)$ WITH EACH OTHER |
| MAX TARGET SIZE | $kH \times kW$ |
| OUTPUT IMAGE SIZE | $H_{out} \times W_{out} \times C_{out}$ |
| AMOUNT OF DATA OF MINI BATCH | MB |
| NUMBER OF OPERATIONS (COMPARISON) | $H_{out} \times W_{out} \times C_{out} \times (kH \times kW) \times MB$ |
| NUMBER OF INSTRUCTIONS OF OPERATION UNIT | NUMBER OF OPERATIONS (COMPARISON) |
| AMOUNT OF DATA | bottom = $H_{in} \times W_{in} \times C_{in} \times MB$<br>top = $H_{out} \times W_{out} \times C_{out} \times MB$<br>mask = $H_{out} \times W_{out} \times C_{out} \times MB(out)$ |

FIG. 21

| | ReLU |
|---|---|
| OPERATION CONTENT | $O(i) = \text{ReLU}(I(i))$ ($O=0$ WHEN $I<0$, $O=I$ WHEN $I \geq 0$) |
| INPUT IMAGE SIZE | $H_{in} \times W_{in} \times C_{in}$ |
| OUTPUT IMAGE SIZE | $H_{out} \times W_{out} \times C_{out}$ |
| AMOUNT OF DATA OF MINI BATCH | MB |
| NUMBER OF OPERATIONS (COMPARISON) | $H_{in} \times W_{in} \times C_{in} \times MB$ |
| NUMBER OF INSTRUCTIONS OF OPERATION UNIT | NUMBER OF OPERATIONS (COMPARISON) |
| AMOUNT OF DATA | bottom = $H_{in} \times W_{in} \times C_{in} \times MB$<br>top = $H_{out} \times W_{out} \times C_{out} \times MB$ |

(I/O IS NUMBER OF INPUT/OUTPUT NEURONS)
I = $H_{in} \times W_{in} \times C_{in}$
O = $H_{out} \times W_{out} \times C_{out}$

FIG. 23

| | Fully-connected |
|---|---|
| OPERATION CONTENT | $O(j) = \Sigma(w_{ij} * I(i) + bias)$ |
| INPUT IMAGE SIZE I | $I = H_{in} \times W_{in} \times C_{in}$ |
| OUTPUT IMAGE SIZE O | $O = H_{out} \times W_{out} \times C_{out}$ |
| AMOUNT OF DATA OF MINI BATCH | MB |
| NUMBER OF OPERATIONS (SUM) | $(I \times O + O) \times MB$ |
| NUMBER OF OPERATIONS (PRODUCT) | $I \times O \times MB$ |
| NUMBER OF INSTRUCTIONS OF OPERATION UNIT | NUMBER OF INSTRUCTIONS (PRODUCT SUM) : $I \times O \times MB$<br>NUMBER OF INSTRUCTIONS (SUM) : NUMBER OF OPERATIONS (SUM) - NUMBER OF INSTRUCTIONS (PRODUCT SUM) = $O \times MB$<br>NUMBER OF INSTRUCTIONS (PRODUCT) : NUMBER OF OPERATIONS (PRODUCT) - NUMBER OF INSTRUCTIONS (PRODUCT SUM) = 0(zero) |
| AMOUNT OF DATA | bottom = $H_{in} \times W_{in} \times C_{in} \times MB$<br>top = $H_{out} \times W_{out} \times C_{out} \times MB$<br>bias = $C_{out}$<br>weight = $H_{in} \times W_{in} \times C_{in} \times H_{out} \times W_{out} \times C_{out}$ |

(I/O IS NUMBER OF INPUT/OUTPUT NEURONS)
$I = H_{in} \times W_{in} \times C_{in}$
$O = H_{out} \times W_{out} \times C_{out}$

FIG. 25

| | Dropout |
|---|---|
| OPERATION CONTENT | $O(i) = I(i)*mask(i)*scale$<br>OUTPUT $O(i)=0$ WHEN BIT MASK $mask(i)=0$, OUTPUT $O(i)=scale \times I(i)$ WHEN $mask(i)=1$ |
| INPUT IMAGE SIZE I | $I = H_{in} \times W_{in} \times C_{in}$ |
| OUTPUT IMAGE SIZE O | $O = H_{out} \times W_{out} \times C_{out}$ |
| AMOUNT OF DATA OF MINI BATCH | MB |
| NUMBER OF OPERATIONS (COMPARISON, PRODUCT) | AT TIME OF LEARNING : $2 \times I \times MB$<br>AT TIME OF PRODUCTION : 0 |
| NUMBER OF INSTRUCTIONS OF OPERATION UNIT | NUMBER OF INSTRUCTIONS (PRODUCT) : $2 \times I \times MB$ |
| AMOUNT OF DATA | bottom = $H_{in} \times W_{in} \times C_{in} \times MB$<br>top = $H_{out} \times W_{out} \times C_{out} \times MB$<br>mask = $H_{in} \times W_{in} \times C_{in} \times MB$ |

(I REPRESENTS NUMBER OF INPUT NEURONS)
I = $H_{in} \times W_{in} \times C_{in}$

FIG. 27

| SoftMax with Loss | |
|---|---|
| OPERATION CONTENT | (1) scale = max(scale, bottom_x[mb][i]) //INPUT MAXIMUM VALUE OF INPUT bottom_x INTO VARIABLE scale// <br> (2) bottom_y[mb][i] -= scale //SUBTRACT MAXIMUM VALUE scale FROM EACH OF ALL INPUTS bottom_x, AND CAUSE ALL INPUTS TO BE NEGATIVE// <br> (3) bottom_y[mb][i] = exp(bottomy[mb][i] //OBTAIN $e^{x-max}$, WHERE x REPRESENTS INPUT max IS MAXIMUM// <br> (4) scale += bottom_y[mb][i] //INPUT $\Sigma e^{x-max}$ OBTAINED BY ADDING ALL $e^{x-max}$ INTO VARIABLE scale// <br> (5) bottom_y[mb][i] /= tmp_sum //DIVIDE ALL $e^{x-max}$ by $\Sigma e^{x-max}$, AND OBTAIN PROBABILITY $e^{x-max}/\Sigma e^{x-max}$// <br> (6) if(t[mb][i] = 1) e -= log(max(bottom_y[mb][i], FLT_MIN) // WHEN CORRECT ANSWER VECTOR t[mb][i]=1, OBTAIN ERROR e BY MULTIPLYING log($e^{x-max}/\Sigma e^{x-max}$) (CROSS ENTROPY ERROR) THAT IS log OF PROBABILITY DESCRIBED ABOVE BY *(-1) TIMES// |
| INPUT SIZE I | $I = H_{in} \times W_{in} \times C_{in}$ |
| OUTPUT SIZE O | $O = H_{out} \times W_{out} \times C_{out}$ |
| AMOUNT OF DATA OF MINI BATCH | MB |
| NUMBER OF OPERATIONS (DIFFERENCE, exp, SUM, QUOTIENT, COMPARISON, log) | NUMBER OF OPERATIONS(COMPARISON) : I×MB×2, <br> NUMBER OF OPERATIONS(DIFFERENCE) : I×MB×2, <br> NUMBER OF OPERATIONS(exp) : I×MB, <br> NUMBER OF OPERATIONS(SUM) : I×MB, <br> NUMBER OF OPERATIONS(QUOTIENT) : I×MB, <br> NUMBER OF OPERATIONS(log) : I×MB |
| NUMBER OF INSTRUCTIONS (DIFFERENCE, exp, SUM, QUOTIENT, COMPARISON, log) | NUMBER OF INSTRUCTIONS(COMPARISON) = NUMBER OF OPERATIONS(COMPARISON), <br> NUMBER OF INSTRUCTIONS(DIFFERENCE) = NUMBER OF OPERATIONS(DIFFERENCE), <br> NUMBER OF INSTRUCTIONS(exp) = NUMBER OF OPERATIONS(exp), <br> NUMBER OF INSTRUCTIONS(SUM) = NUMBER OF OPERATIONS(SUM), <br> NUMBER OF INSTRUCTIONS(QUOTIENT) = NUMBER OF OPERATIONS(QUOTIENT), <br> NUMBER OF INSTRUCTIONS(log) = NUMBER OF OPERATIONS(log) |
| AMOUNT OF DATA | bottom = $H_{in} \times W_{in} \times C_{in} \times MB$ <br> top = $H_{out} \times W_{out} \times C_{out} \times MB$ <br> (ONLY FOR LEARNING, ZERO AT TIME OF PRODUCTION) |

FIG. 28

■ Softmax

```
            e = 0;
            for (mb = 0; mb < MB; mb++) {
  (1)          for (i =0; i < N; i++) {
  max            scale = max(scale, bottom_x[mb][i]);
               } for (i =0; i < N; i++) {
  (2)            bottom_y[mb][i] -= scale;
DIFFERENCE     } for (i =0; i < N; i++) {
  (3)            bottom_y[mb][i] = exp(bottom_y[mb][i]);
  exp          } scale = 0;
               for (i =0; i < N; i++) {
  (4)            scale += bottom_y[mb][i];
  SUM          } for (i =0; i < N; i++) {
  (5)            bottom_y[mb][i] /= tmp_sum;
QUOTIENT     }}
```

■ Output (Softmaxerror)

```
                    e = 0;
                    for (mb = 0; mb < MB; mb++) {
                      for (i =0; i < N; i++) {
  (6)                   if (t[mb][i] == 1) {
DIFFERENCE, log, max      e -= log(max(bottom_y[mb][i], FLT_MIN));
                        }
                    }
```

FIG. 29
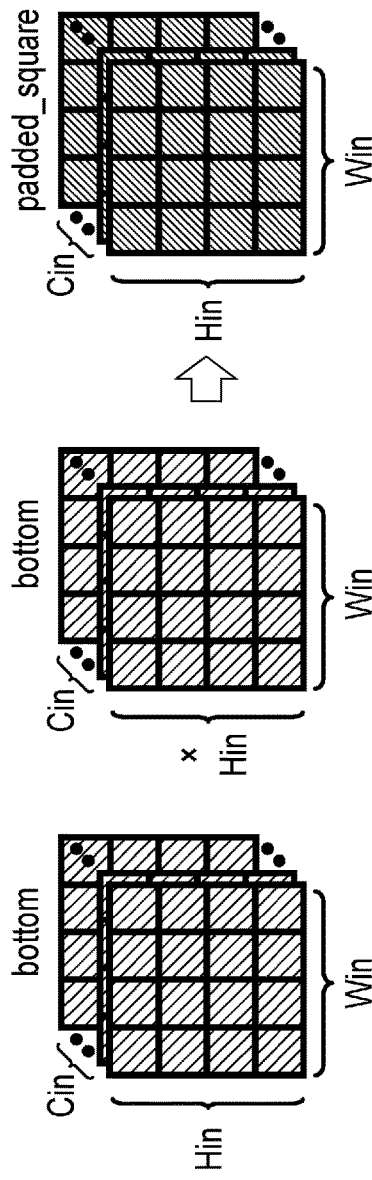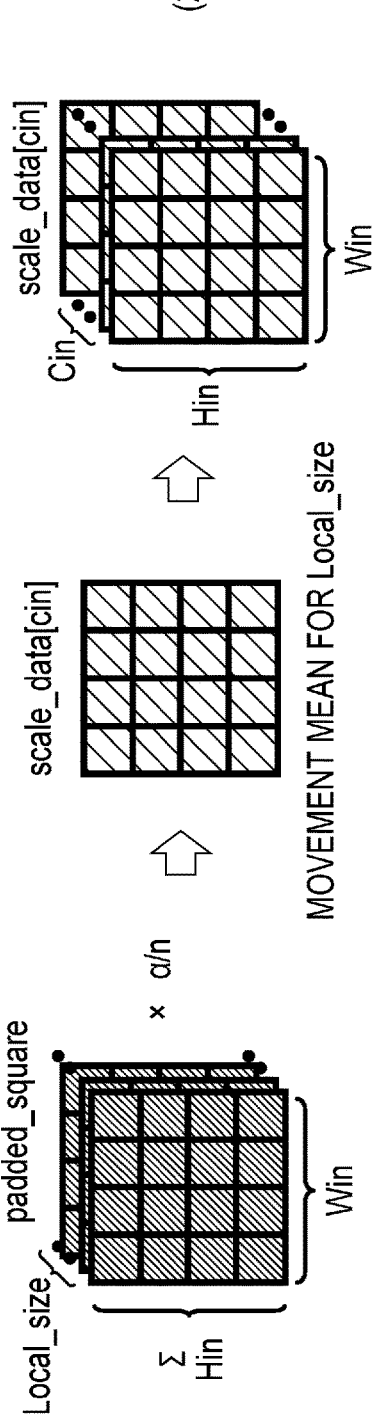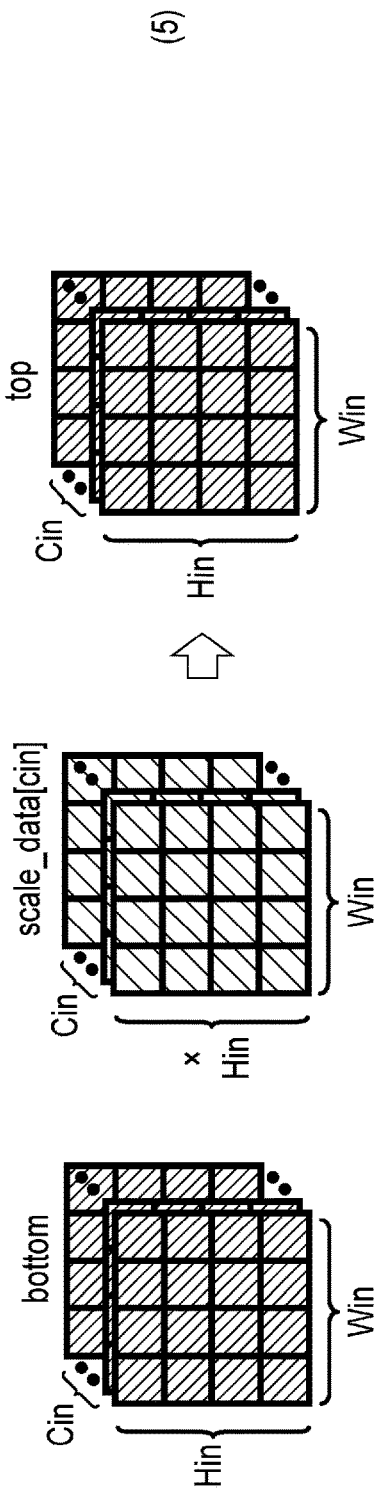

FIG. 30

```
alpha_over_size = alpha / local_size;
k = 1;
for (i = 0; i < MB * C_in * W_in * H_in; i++) {
  scale_data[i] = k;
}
for (mb = 0; mb < MB; mb++) {
```

(1) PRODUCT
```
  for (i = 0; i < C_in*H_in*W_in; i++) {
    padded_square[i] = bottom_data[mb][i] * bottom_data[mb][i];
  }
  // create the first channel scale
```

(2) PRODUCT, SUM
```
  for (c = 0; c < local_size; c++) {
    for (i = 0; i < H_in*W_in; i++) {
      scale_data[mb][0][i] += alpha_over_size * padded_square[c][i];
    }
  }
```

(3) SUM, PRODUCTx2, DIFFERENCE
```
  for (c= 1; c < C_in; c++) {
    // copy previous scale, add head, subtract tail
    for (i = 0; i < H_in * W_in; i++) {
      scale_data[mb][c][i] = scale_data[mb][c-1][i]
        + alpha_over_size * padded_square[c+local_size-1][i]
        - alpha_over_size * padded_square[c-1];
}}}
```

(4) pow
```
for (i = 0; i < C_in*H_in*W_in; i++) {
  top_data[i] = pow(scale_data[i], -beta);
}
```

(5) PRODUCT
```
for (i = 0; i < C_in*H_in*W_in; i++) {
  top_data[i] *= bottom_data[i];
}
```

FIG. 31

| LRN(1) | |
|---|---|
| OPERATION CONTENT | (1) OBTAIN SQUARE $X^2$ OF OUTPUT X OF CONVOLUTION LAYER FOR ELEMENTS OF H*W*$C_{in}$<br>(2) MULTIPLY EACH OF ELEMENTS OF Local_size=n IN CHANNEL Cin BY α AND DIVIDE EACH OF ELEMENTS BY Local_size=n (MULTIPLY BY α/n), TO THEREBY OBTAIN MEAN scale_data[cin] (=scale_data[mb][0][i], MEAN OF C=0) FOR LOCAL NUMBER Local_size IN CHANNEL DIRECTION OF ELEMENTS $X^2$ OF padded_square<br>(3) OBTAIN MEAN FOR REMAINING c=1 TO $C_{in}$ WHILE MOVING WITHIN CHANNEL $C_{in}$. SPECIFICALLY, OBTAIN MEAN (MOVEMENT MEAN) OF c=1 BY SUBTRACTING TAIL tail OF MEAN (scale_data[mb][c-1][i]) OBTAINED FOR c=0 IN OPERATION (2) FROM MEAN AND ADDING HEAD head THERETO. REPEAT THE SAME FOR c=2 AND THEREAFTER.<br>(4) OBTAIN OUTPUT top_data[i] BY RAISING OUTPUT IN OPERATION (3) TO POWER OF -3/4. OBTAIN OUTPUT top_data[i] FOR i=$C_{in}$*$H_{in}$*$W_{in}$<br>(5) MULTIPLY OUTPUT top_data[i] IN OPERATION (4) BY INPUT bottom_data[i] |
| INPUT IMAGE SIZE I | I = $H_{in} \times W_{in} \times C_{in}$ ($C_{in}$ IS NUMBER OF INPUT CHANNELS) |
| OUTPUT IMAGE SIZE O | O = $H_{out} \times W_{out} \times C_{out}$ ($C_{out}$ IS NUMBER OF OUTPUT CHANNELS) |
| AMOUNT OF DATA OF MINI BATCH | MB |
| NUMBER OF OPERATIONS | (1) PRODUCT : $C_{in} \times H_{in} \times W_{in}$<br>(2) PRODUCT : local_size $\times H_{in} \times W_{in}$  SUM : local_size $\times H_{in} \times W_{in}$<br>(3) PRODUCT : $(C_{in}-1) \times H_{in} \times W_{in} \times 2$  SUM : $(C_{in}-1) \times H_{in} \times W_{in}$  DIFFERENCE : $(C_{in}-1) \times H_{in} \times W_{in}$<br>(4) POWER : $C_{in} \times H_{in} \times W_{in}$<br>(5) PRODUCT : $C_{in} \times H_{in} \times W_{in}$<br>THEREFORE<br>NUMBER OF OPERATIONS(PRODUCT) :<br>$(4C_{in} + \text{local\_size} - 2) \times W_{in} \times H_{in} \times MB$<br>NUMBER OF OPERATIONS(SUM) :<br>$(C_{in} + \text{local\_size} - 1) \times W_{in} \times H_{in} \times MB$<br>NUMBER OF OPERATIONS(DIFFERENCE) :<br>$(C_{in} - 1) \times W_{in} \times H_{in} \times MB$<br>NUMBER OF OPERATIONS(Pow) : $C_{in} \times W_{in} \times H_{in} \times MB$ |

FIG. 32

| | LRN(2) |
|---|---|
| NUMBER OF INSTRUCTIONS OF OPERATION UNIT | NUMBER OF INSTRUCTIONS(PRODUCT SUM) : $\{local\_size \times W_{in} \times H_{in} + (C_{in}-1) \times W_{in} \times H_{in}\} \times MB$<br>NUMBER OF INSTRUCTIONS(PRODUCT DIFFERENCE) : $(C_{in}-1) \times W_{in} \times H_{in} \times MB$<br>NUMBER OF INSTRUCTIONS(SUM) :<br>NUMBER OF OPERATIONS(SUM)−<br>NUMBER OF INSTRUCTIONS(PRODUCT SUM)=0<br>NUMBER OF INSTRUCTIONS(DIFFERENCE) :<br>NUMBER OF OPERATIONS(DIFFERENCE)−<br>NUMBER OF INSTRUCTIONS(PRODUCT DIFFERENCE)=0<br>NUMBER OF INSTRUCTIONS(PRODUCT) :<br>NUMBER OF OPERATIONS(PRODUCT)−<br>NUMBER OF INSTRUCTIONS(PRODUCT SUM)−<br>NUMBER OF INSTRUCTIONS(PRODUCT DIFFERENCE)= $C_{in} \times W_{in} \times H_{in} \times MB \times 4$<br>NUMBER OF INSTRUCTIONS(pow) :<br>NUMBER OF OPERATIONS(pow)= $C_{in} \times W_{in} \times H_{in} \times MB$ |
| AMOUNT OF DATA | bottom = $H_{in} \times W_{in} \times C_{in} \times MB$<br>top = $H_{out} \times W_{out} \times C_{out} \times MB$<br>scale = $H_{in} \times W_{in} \times C_{in} \times MB$<br>padded square = $W_{in} \times H_{in} \times C_{in}$ |

FIG. 33

| Batch Normalization (1) | |
|---|---|
| OPERATION CONTENT (1) EXECUTE MEAN, VARIANCE, NORMALIZATION, AND SCALE AND SHIFT | MEAN $\quad \mu[C_i] \leftarrow \dfrac{1}{MB \times H \times W} \sum\limits_{mb_i}^{MB} \sum\limits_{x}^{H} \sum\limits_{y}^{W} \text{bottom}[mb_i][C_i][x][y]$ |
| | VARIANCE $\quad \sigma^2[C_i] \leftarrow \dfrac{1}{MB \times H \times W} \sum\limits_{mb_i}^{MB} \sum\limits_{x}^{H} \sum\limits_{y}^{W} (\text{bottom}[mb_i][C_i][x][y] - \mu[C_i])^2 \quad$ (INCLUDING SQUARE ROOT AND DIVISION) |
| | NORMALIZATION $\quad \text{temp}[mb_i][C_i][x][y] \leftarrow \dfrac{\text{bottom}[mb_i][C_i][x][y] - \mu[C_i]}{\sqrt{\sigma^2[C_i] + \varepsilon}}$ |
| | $\left\{\begin{array}{l} t[C_i] \leftarrow \dfrac{1}{\sqrt{\sigma^2[C_i] + \varepsilon}} \quad \text{(SQUARE ROOT AND DIVISION : C TIMES)} \\ \text{temp}[b_i][C_i][x][y] \leftarrow (\text{bottom}[b_i][C_i][x][y] - \mu[C_i]) \times t[C_i] \quad \text{(SUBTRACTION AND MULTIPLICATION : } MB*C*H*W \text{ TIMES)} \end{array}\right.$ |
| | SCALE AND SHIFT $\quad \text{top}[mb_i][C_i][x][y] \leftarrow \gamma \cdot \text{temp}[mb_i][C_i][x][y] + \beta$ |

FIG. 34

| | Batch Normalization(2) |
|---|---|
| OPERATION CONTENT | (1) EXECUTE MEAN, VARIANCE, NORMALIZATION, AND SCALE AND SHIFT OF OUTPUT IMAGES OF CHANNELS Ci CALCULATED IN MINI BATCHES (MB)<br>(2) REPEAT OPERATION OF (MEAN OF CHANNELS Ci CALCULATED IN CURRENT MB)+(MEAN OF CHANNELS Ci CALCULATED IN PREVIOUS MB)*(COEFFICIENT)= (MOVEMENT MEAN) FOR ALL CHANNELS C0 TO Cn<br>(3) REPEAT OPERATION OF (VARIANCE OF CHANNELS Ci CALCULATED BY CURRENT MB)*(COEFFICIENT)+ (VARIANCE OF CHANNELS Ci CALCULATED BY PREVIOUS MB)*(COEFFICIENT)=(MOVEMENT MEAN) FOR ALL CHANNELS C0 TO Cn |
| INPUT IMAGE SIZE | bottom = $H_{in} \times W_{in} \times C_{in} \times MB$ |
| OUTPUT IMAGE SIZE | top = $H_{out} \times W_{out} \times C_{out} \times MB$ |
| AMOUNT OF DATA OF MINI BATCH | MB |
| NUMBER OF OPERATIONS | MEAN(mean) : NUMBER OF OPERATIONS(PRODUCT) = NUMBER OF OPERATIONS(SUM) = $H_{in} \times W_{in} \times C_{in} \times MB$<br>VARIANCE(variance) :<br>NUMBER OF OPERATIONS(DIFFERENCE) = $H_{in} \times W_{in} \times C_{in} \times MB$<br>NUMBER OF OPERATIONS(PRODUCT) = $2 \times H_{in} \times W_{in} \times C_{in} \times MB$<br>NUMBER OF OPERATIONS(SUM) = $H_{in} \times W_{in} \times C_{in} \times MB$<br>MOVEMENT MEAN :<br>NUMBER OF OPERATIONS(PRODUCT) = $3 \times C_{in}$<br>NUMBER OF OPERATIONS(SUM) = $2 \times C_{in}$<br>NORMALIZATION :<br>NUMBER OF OPERATIONS(SUM) = $C_{in}$<br>NUMBER OF OPERATIONS(SQUARE ROOT) = $C_{in}$<br>NUMBER OF OPERATIONS(QUOTIENT) = $H_{in} \times W_{in} \times C_{in} \times MB$<br>SCALE AND SHIFT : NUMBER OF OPERATIONS(PRODUCT) = $H_{in} \times W_{in} \times C_{in} \times MB$,<br>NUMBER OF OPERATIONS(SUM) = $H_{in} \times W_{in} \times C_{in} \times MB$ |

FIG. 35

| Batch Normalization(3) | |
|---|---|
| NUMBER OF INSTRUCTIONS OF OPERATION UNIT | mean : <br> NUMBER OF INSTRUCTIONS(PRODUCT SUM) = $W_{in} \times H_{in} \times C_{in} \times MB$ <br> variance : <br> NUMBER OF INSTRUCTIONS(DIFFERENCE) = $H_{in} \times W_{in} \times C_{in} \times MB$ <br> NUMBER OF INSTRUCTIONS(PRODUCT) = $H_{in} \times W_{in} \times C_{in} \times MB$ <br> NUMBER OF INSTRUCTIONS(PRODUCT SUM) = $H_{in} \times W_{in} \times C_{in} \times MB$ <br> MOVEMENT MEAN : <br> NUMBER OF INSTRUCTIONS(PRODUCT) = $C_{in}$ <br> NUMBER OF INSTRUCTIONS(PRODUCT SUM) = $2 \times C_{in}$ <br> NORMALIZATION : <br> NUMBER OF INSTRUCTIONS(SUM) = $C_{in}$ <br> NUMBER OF INSTRUCTIONS(SQUARE ROOT) = $C_{in}$ <br> NUMBER OF INSTRUCTIONS(QUOTIENT) = $H_{in} \times W_{in} \times C_{in} \times MB$ <br> SCALE AND SHIFT : <br> NUMBER OF INSTRUCTIONS(PRODUCT SUM) = <br> NUMBER OF OPERATIONS(PRODUCT) = $H_{in} \times W_{in} \times C_{in} \times MB$ |
| AMOUNT OF DATA | bottom = $H_{in} \times W_{in} \times C_{in} \times MB$ <br> top = $H_{out} \times W_{out} \times C_{out} \times MB$ <br> deviation = $C_{in}$ <br> bias($\beta$) = $C_{out}$ <br> bias($\gamma$) = $C_{out}$ |

FIG. 36

| CALCULATION METHOD OF RAISING TO POWER OF -3/4 | INITIAL VALUE ESTIMATION (NUMBER OF INSTRUCTIONS) | CONVERGENT OPERATION (NUMBER OF INSTRUCTIONS) | TOTAL NUMBER OF INSTRUCTIONS | NUMBER OF CLOCK CYCLES | ERROR [ulp(log$_2$)] |
|---|---|---|---|---|---|
| ORIGINAL (USE SPECIAL OPERATION UNITS) | - | fsqrt(2) + fmul(1) + fdiv(1) | 1(PRODUCT SUM) + 3(SPECIAL) | 1*1(PRODUCT SUM) + (2*23 + 1*22)(SPECIAL)= 1(PRODUCT SUM) + 68(SPECIAL) | (-1) |
| ONLY MAGIC NUMBER | isrl(2) +isub(2) = 4 | 0 | 4(PRODUCT SUM) | 4 * 1 = 4 | 19.53 |
| MAGIC NUMBER + THIRD ORDER HOUSEHOLDER METHOD* TWO ROTATIONS | isrl(2) +isub(2) = 4 | fma(5*2) + fmul(5*2) = 20 | 24(PRODUCT SUM) | 24 * 1 = 24 | 1.28 |
| MAGIC NUMBER NEWTON'S METHOD*FOUR ROTATIONS | isrl(2) +isub(2) = 4 | fma(2*4) + fmul(6*4) = 32 | 36(PRODUCT SUM) | 36 * 1 = 36 | 0.95 |
| MAGIC NUMBER + THIRD ORDER HOUSEHOLDER METHOD + FOURTH ORDER HOUSEHOLDER METHOD | isrl(2) +isub(2) = 4 | fma(5+5) + fmul(5+7) = 22 | 26(PRODUCT SUM) | 26 * 1 = 26 | 0.87 |

FIG. 37

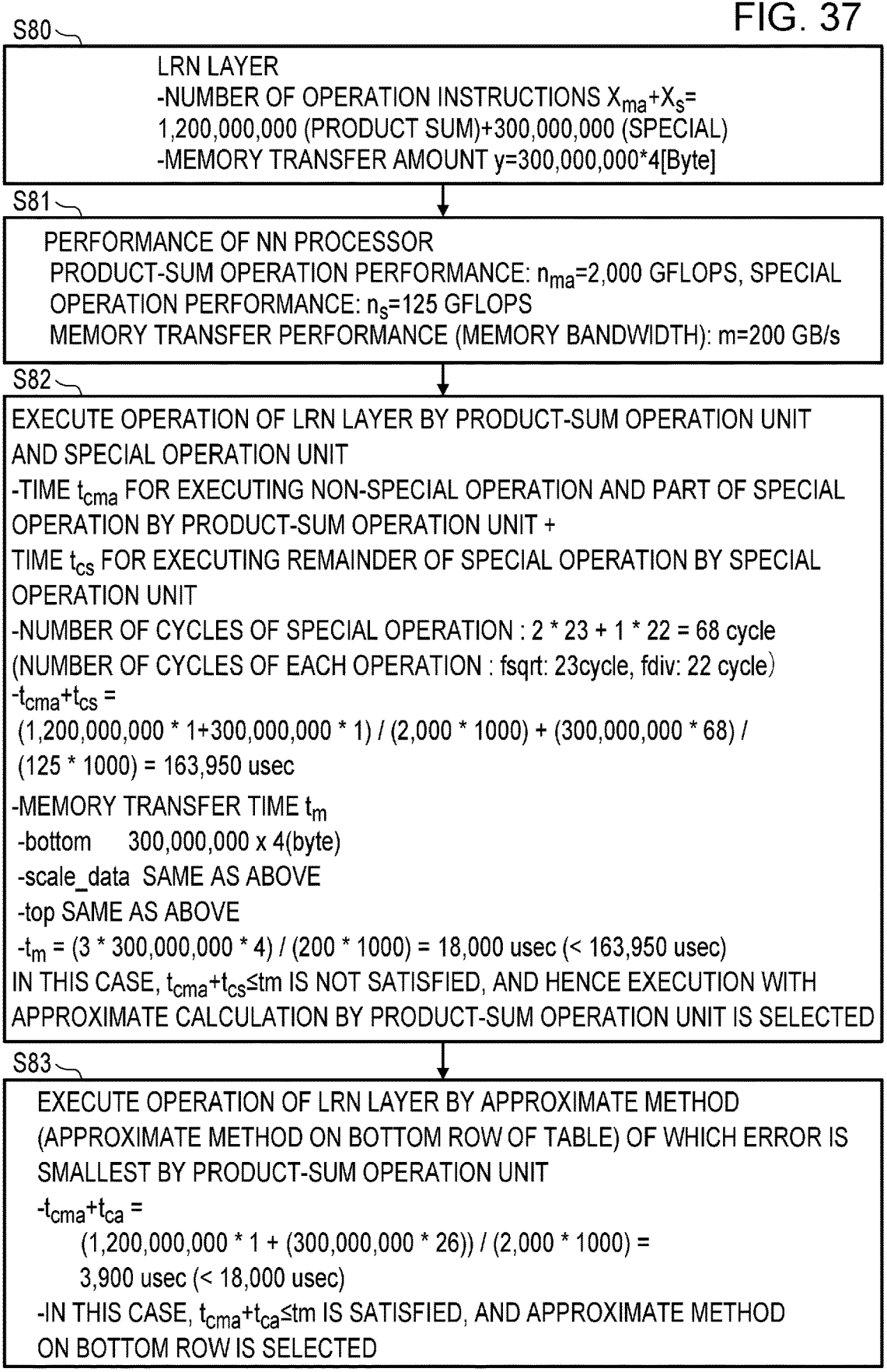

S80
LRN LAYER
- NUMBER OF OPERATION INSTRUCTIONS $X_{ma}+X_s=$
1,200,000,000 (PRODUCT SUM)+300,000,000 (SPECIAL)
- MEMORY TRANSFER AMOUNT y=300,000,000*4[Byte]

S81
PERFORMANCE OF NN PROCESSOR
  PRODUCT-SUM OPERATION PERFORMANCE: $n_{ma}$=2,000 GFLOPS, SPECIAL
  OPERATION PERFORMANCE: $n_s$=125 GFLOPS
  MEMORY TRANSFER PERFORMANCE (MEMORY BANDWIDTH): m=200 GB/s

S82
EXECUTE OPERATION OF LRN LAYER BY PRODUCT-SUM OPERATION UNIT
AND SPECIAL OPERATION UNIT
- TIME $t_{cma}$ FOR EXECUTING NON-SPECIAL OPERATION AND PART OF SPECIAL
OPERATION BY PRODUCT-SUM OPERATION UNIT +
TIME $t_{cs}$ FOR EXECUTING REMAINDER OF SPECIAL OPERATION BY SPECIAL
OPERATION UNIT
- NUMBER OF CYCLES OF SPECIAL OPERATION : 2 * 23 + 1 * 22 = 68 cycle
(NUMBER OF CYCLES OF EACH OPERATION : fsqrt: 23cycle, fdiv: 22 cycle)
- $t_{cma}+t_{cs}$ =
(1,200,000,000 * 1+300,000,000 * 1) / (2,000 * 1000) + (300,000,000 * 68) /
(125 * 1000) = 163,950 usec
- MEMORY TRANSFER TIME $t_m$
  -bottom    300,000,000 x 4(byte)
  -scale_data  SAME AS ABOVE
  -top SAME AS ABOVE
- $t_m$ = (3 * 300,000,000 * 4) / (200 * 1000) = 18,000 usec (< 163,950 usec)
IN THIS CASE, $t_{cma}+t_{cs} \leq tm$ IS NOT SATISFIED, AND HENCE EXECUTION WITH
APPROXIMATE CALCULATION BY PRODUCT-SUM OPERATION UNIT IS SELECTED S83
EXECUTE OPERATION OF LRN LAYER BY APPROXIMATE METHOD
(APPROXIMATE METHOD ON BOTTOM ROW OF TABLE) OF WHICH ERROR IS
SMALLEST BY PRODUCT-SUM OPERATION UNIT
- $t_{cma}+t_{ca}$ =
    (1,200,000,000 * 1 + (300,000,000 * 26)) / (2,000 * 1000) =
    3,900 usec (< 18,000 usec)
- IN THIS CASE, $t_{cma}+t_{ca} \leq tm$ IS SATISFIED, AND APPROXIMATE METHOD
ON BOTTOM ROW IS SELECTED

FIG. 38

| CALCULATION METHOD OF RAISING TO POWER OF -1/2 | INITIAL VALUE ESTIMATION (NUMBER OF INSTRUCTIONS) | CONVERGENT OPERATION (NUMBER OF INSTRUCTIONS) | TOTAL (NUMBER OF INSTRUCTIONS) | NUMBER OF CLOCK CYCLES | ERROR [ulp(log$_2$)] |
|---|---|---|---|---|---|
| ORIGINAL (USE SPECIAL OPERATION UNITS) | - | fsqrt(1) + fdiv(1) = 2 | 2 | 23 + 22(SPECIAL) = 45(SPECIAL) | (-1) |
| ONLY MAGIC NUMBER | isrt(1) +isub(1) = 2 | 0 | 2 | 2 * 1 = 2(PRODUCT SUM) | 19.138 |
| MAGIC NUMBER + THIRD ORDER HOUSEHOLDER METHOD | isrt(1) +isub(1) = 2 | fma(4) + fmul(2) + fsub(1) = 7 | 9 | 9 * 1 = 9(PRODUCT SUM) | 6.704 |
| MAGIC NUMBER + FOURTH ORDER HOUSEHOLDER METHOD | isrt(1) +isub(1) = 2 | fma(5) + fmul(3) + fsub(1) = 9 | 11 | 11 * 1 = 11(PRODUCT SUM) | 2.58 |
| MAGIC NUMBER + FIFTH ORDER HOUSEHOLDER METHOD | isrt(1) +isub(1) = 2 | fma(6) + fmul(3) + fsub(1) = 10 | 12 | 12 * 1 = 12(PRODUCT SUM) | 0.00 |

INFORMATION PROCESSING APPARATUS, NEURAL NETWORK PROGRAM, AND PROCESSING METHOD FOR NEURAL NETWORK

CROSS-REFERENCE TO RELATED APPLICATION

This application is based upon and claims the benefit of priority of the prior Japanese Patent Application No. 2018-239640, filed on Dec. 21, 2018, the entire contents of which are incorporated herein by reference.

FIELD

The present invention relates to an information processing apparatus, a neural network program, and a processing method for the neural network.

BACKGROUND

Deep learning (hereinafter referred to as DL) is machine learning using a multilayered neural network (hereinafter referred to as a NN). A deep neural network (hereinafter referred to as a DNN), which is an example of deep learning, is a network in which an input layer, a plurality of hidden layers, and an output layer are arranged in order. Each layer has one or a plurality of nodes, and each node has a value. Nodes between one layer and the next layer are connected to each other by an edge, and each edge has variables (or parameters) such as a weight or a bias.

In the NN, the values of the nodes in each layer are obtained by executing a predetermined operation (or computation, calculation or arithmetic operation, hereinafter referred to as "operation") based on the weights of the edges and the values of the nodes in the preceding stage, for example. When the input data is input to the nodes of the input layer, the values of the nodes in the next layer (first layer) are obtained by a predetermined operation. Then, the data obtained by the operation is input to the next layer (second layer), which obtains the values of the nodes in the layer (second layer) by a predetermined operation for the layer (second layer). Then, the values of the nodes in the output layer, which is the final layer, become the output data for the input data.

The plurality of layers in the NN execute various operations on the basis of the variables and the input data from the previous layer. The operations of the plurality of layers include (1) basic arithmetic operations, that is, addition, subtraction, multiplication, and division, (2) a product-sum operation in which multiplication and addition are performed together, (3) a logical operation, and (4) special operations such as raising to a power, division (including reciprocal numbers), a hyperbolic tangent (tanh), a square root, and a sigmoid function.

A processor generally includes a product-sum operation circuit and a special operation circuit as operation circuits. The product-sum operation circuit includes a logical operation circuit in addition to a multiplier and an adder-subtractor so as to perform the product-sum operation. Meanwhile, the special operation circuit includes a plurality of operation circuits that execute special operations other than the operation performed by the product-sum operation circuit. The division is executed by the operation circuit in the special operation circuit in this specification as an example.

The NN includes a convolution layer (convolutional neural network) that performs a convolution operation, and a pooling layer that is inserted right after the convolution layer when image recognition is performed, for example. The pooling layer may be a max pooling layer that selects the maximum value of a plurality of elements (plurality of pixels) of the output of the convolution layer, for example. The NN further includes a local response normalization layer (LRN layer) that normalizes the pixels between channels, a batch normalization layer (BN layer) that normalizes the pixels in the channel, a fully connected layer, a Softmax layer used as the activation function of the output layer, a ReLU layer that is a non-linear activation function, and a Dropout layer that temporarily deactivates some nodes in the network besides the convolution layer and the pooling layer. A long short term memory layer (LSTM layer) is provided in a recurrent neural network (RNN).

The NN is described in Japanese Patent Application Publication No. H06-215021, Japanese Patent Application Publication No. 2005-275626, and ImageNet Classification with Deep Convolutional Neural Networks, Alex Krishwvsky, Ilya Sutskever, Geoffrey E. Hinton, (https://papers.nips.cc/paper/4824-imagenet-classification-with-deep-convolutional-neural-networks.pdf), for example.

There are cases where the operations of the layers in the NN include only non-special operations executed by the product-sum operation circuit, which is a general-purpose operation circuit, and cases where the operations of the layers include special operations in addition to the non-special operations, and include the operations executed by the product-sum operation circuit and the operations executed by the special operation circuit.

SUMMARY

However, a NN processor that executes the operation of the NN has a first number of product-sum operation circuits and a second number of special operation circuits included therein in consideration of the operation amount of the entire NN. When the first number is higher than the second number, and the operation amount of the layer including the special operation includes a large operation amount performed by the special operation circuit and a relatively small operation amount performed by the product-sum operation circuit, the ratio between the operation amounts of the both operation circuits and the ratio of the processing capacities of the both operation circuits become imbalanced. As a result, the operation time of the special operation circuit in the layer including the special operation becomes extremely long, and the operation time of the layer including the special operation becomes a bottleneck for the operation time of the entire NN.

According to an first aspect of the present embodiment, an information processing apparatus includes a memory, a processor, connected to the memory, that includes a first operation circuit that configured to execute at least a multiplication operation, an addition operation, a logical operation, and a product-sum operation, a second operation circuit that configured to execute a certain operation different from the multiplication operation, the addition operation, the logical operation, and the product-sum operation; and a resister, wherein the processor configured to execute a first operation in a first layer in a neural network including a plurality of layers, the first operation including the certain operation, execute the first operation by a second method of calculating the certain operation of the first operation by the second operation circuit, in a case where second operation time necessary for the first operation when the certain operation of the first operation is executed by the second operation circuit is equal to or less than memory transfer time necessary for memory transfer between the memory and the resister for the first operation, and execute the first operation by a first method of calculating the certain operation of the first operation by an approximate calculation by the first operation circuit, in a case where first operation time necessary for the first operation when the first operation is executed by the first method is equal to or less than the memory transfer time, when the second operation time is not equal to or less than the memory transfer time.

According to the first aspect, the elongation of the whole operation time of the NN due to the longer operation time of the special operation circuit is suppressed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of special operations included in the operations of the plurality of layers in the NN.

FIG. 17 is a table illustrating the operation content, the input image size, the amount of padding, the input channel number, the stride number, the output image size, the number of operations, the number of operation instructions of the operation circuit, the amount of data, and the like of the convolution layer.

FIG. 19 is a table illustrating the operation content, the input size, the output size, the number of operations, the number of operation instructions of the operation circuit, the amount of data, and the like of the max pooling layer.

FIG. 21 is a table illustrating the operation content, the input size, the output size, the number of operations, the number of operation instructions of the operation circuit, the amount of data, and the like of the activation function ReLU layer.

FIG. 23 is a table illustrating the operation content, the input size, the output size, the number of operations, the number of operation instructions of the operation circuit, the amount of data, and the like of the fully connected layer FC.

FIG. 25 is a table illustrating the operation content, the input size, the output size, the number of operations, the number of operation instructions of the operation circuit, the amount of data, and the like of the Dropout layer.

FIG. 27 is a table illustrating the operation content, the input size, the output size, the number of operations, the number of operation instructions of the operation circuit, the amount of data, and the like of the Softmax layer.

FIG. 28 illustrates the source code of the operation of the Softmax layer.

FIG. 29 describes the operation of the LRN layer.

FIG. 30 illustrates a source code of the operation of the LRN layer.

FIG. 31 and FIG. 32 are tables illustrating the operation content, the input size, the output size, the number of operations, the number of operation instructions of the operation circuit, the amount of data, and the like of the LRN layer.

FIG. 33 illustrates the operation expressions of the operation content of the batch normalization layer.

FIG. 34 and FIG. 35 are tables illustrating the operation content, the input size, the output size, the number of operations, the number of operation instructions of the operation circuit, the amount of data, and the like of the batch normalization layer.

FIG. 36 illustrates a table for the special operation (power of $-\frac{3}{4}$) and the approximate calculation of the LRN layer.

FIG. 37 is a flow chart illustrating a specific example of the comparison between the operation time including the special operation in the LRN layer and the memory transfer time, and the selection of the approximate calculation.

FIG. 38 illustrates a table of the special operation (power of $-\frac{1}{2}$) and the approximate calculations of the batch normalization layer.

DESCRIPTION OF EMBODIMENTS

Table of Contents
1. Example of NN
2. Configuration Example of Information Processing Apparatus that executes NN
3. Example of Operation Unit of NN Execution Processor
4. Problem of NN Execution Processor
5. Outline of NN Processor in this Embodiment
6. Selection of whether to calculate Special Operation by Special Operation Unit or to calculate Special Operation with Approximate Calculation by Product-sum Operation Unit
7. Selection of Approximate Calculation
8. Examples of Operations of Layers in NN, Number of Operations, Number of Operation Instructions, and Data Amount
9. Selection method based on Specific Examples An embodiment of the present invention is described below along the table of contents described above.

1. Example of NN

Figure 1:
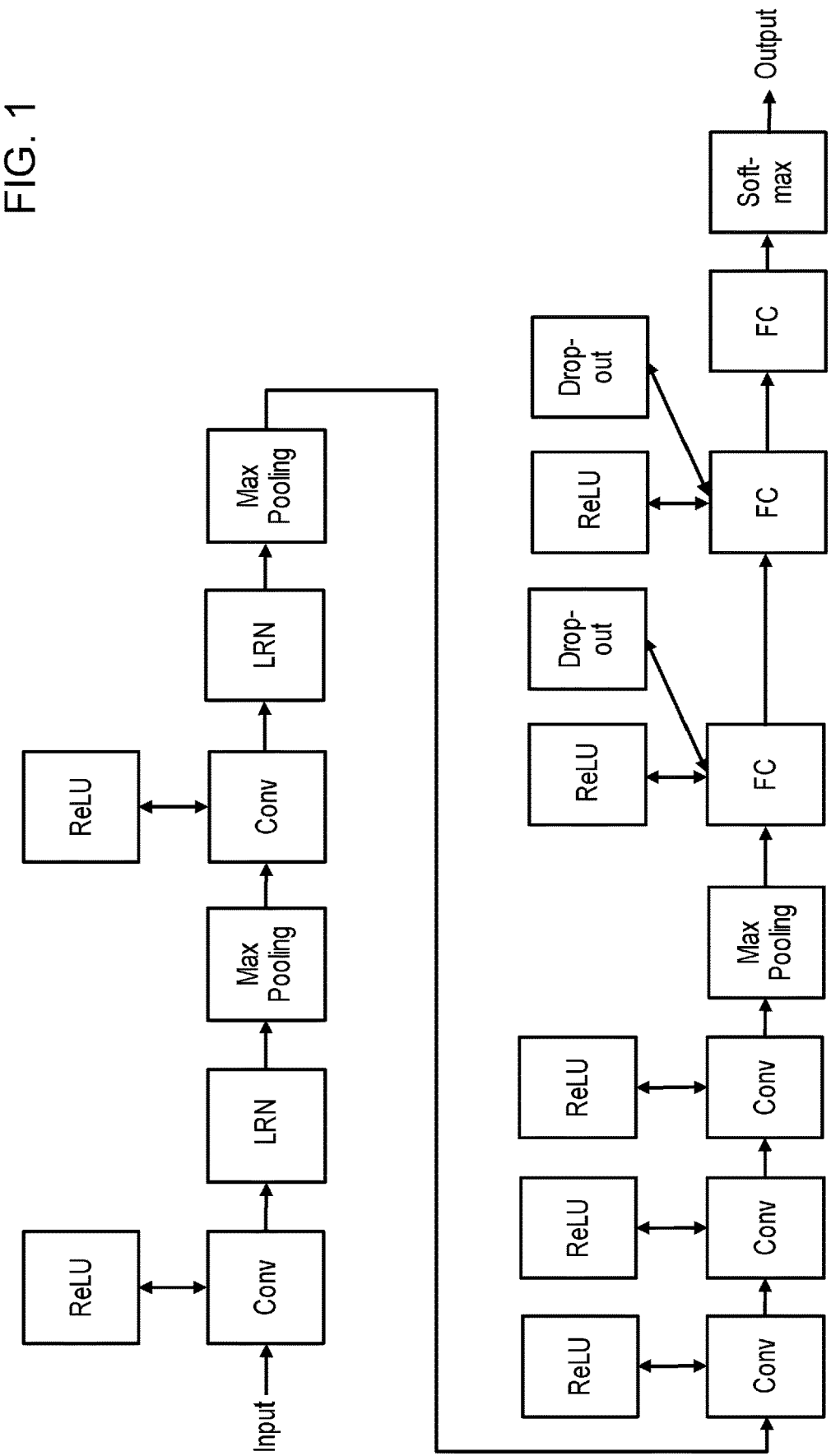
FIG. 1 illustrates an example of a neural network (hereinafter referred to as a NN).

FIG. 1 illustrates an example of a neural network (hereinafter referred to as a NN). The NN in FIG. 1 is AlexNet in ImageNet Cassification with Deep Convolutional Neural Networks, Alex Krishwvsky, Ilya Sutskever, Geoffrey E. Hinton, (https://papers.nips.cc/paper/4824-imagenet-assification-with-deep-convolutional-neural-networks.pdf), and an NN to which this embodiment is applied is not limited to this NN.

The NN in FIG. 1 is a model of object category recognition. Images are input to the model of the object category recognition, which then classifies the images into countable categories in accordance with the content (for example, numeric characters) of the input images, for example. The NN includes, as hidden layers, a convolution layer CONV, an activation function layer ReWU, a local response normalization layer LRN, a max pooling layer MAX_POOUNG, a fully connected layer FC, and a dropout layer Dropout between an input layer INPUT and a softmax layer SOFTMAX, which is an output layer.

The hidden layers may include a batch normalization layer other than those described above. For a recurrent neural network RNN, an LSTM layer may be included in the hidden layer. Each layer has a single node or a plurality of nodes, and the nodes in a layer and a layer thereafter are connected to each other via links or edges.

The convolution layer CONV executes a product-sum operation of multiplying the pixel data of an image, for example, input into a plurality of nodes in the input layer INPUT by weights associated to the links or edges between the nodes and then adding a bias thereto. The convolution layer CONV outputs pixel data of the output image having the features of the image to the plurality of nodes in convolution layer 11.

The output of the convolution layer is input to the activation function layer ReLU, which then outputs a value of a ReLU function. The LRN layer performs normalization of the pixels between the channels. The max pooling layer MAX_POOUNG extracts and outputs the maximum value of a plurality of neighboring nodes. The fully connected layer FC generates a value of all the nodes by multiplying the values of all nodes in the previous layer by the weights of the links or the edges and adding a bias thereto. The softmax layer SOFTMAX outputs the probabilities of whether the object in the image corresponds to specific objects to the nodes corresponding to a plurality of object categories.

The dropout layer enhances the robustness (solidity, toughness, sturdiness) of the NN by placing some of the plurality of nodes into a deactivated state. The batch normalization layer normalizes the pixel data of the output image generated by the convolution operation of the convolution layer, and suppresses the bias in the distribution, for example. The LSTM layer has one kind of memory function provided in the recurrent neural network RNN.

2. Configuration Example of Information Processing Apparatus that Executes NN

Figure 2:
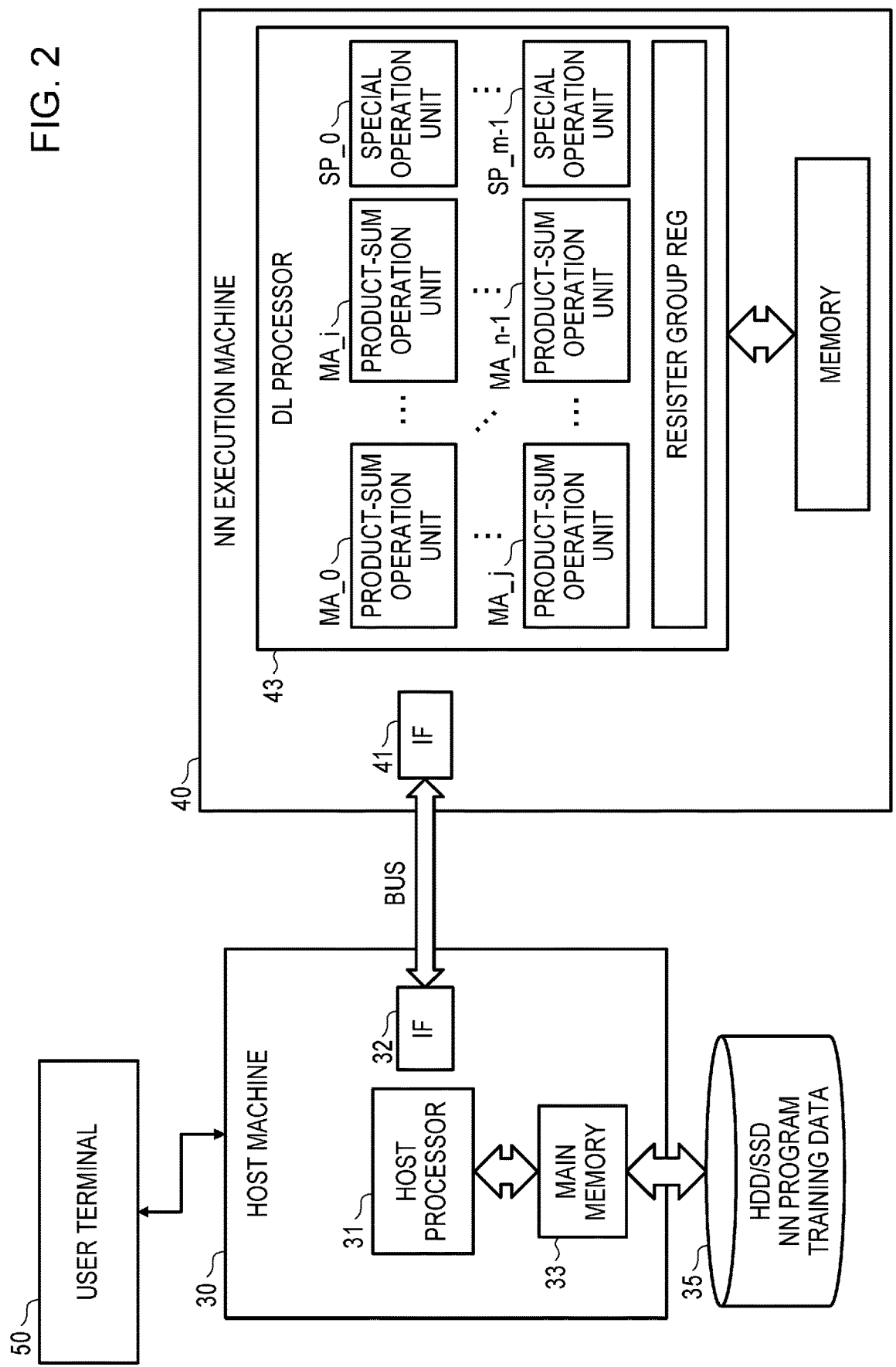
FIG. 2 illustrates a configuration example of a system of an information processing apparatus that executes the operation of the NN in this embodiment.

FIG. 2 illustrates a configuration example of a system of an information processing apparatus that executes the operation of the NN in this embodiment. The information processing system includes a host machine 30 and a NN execution machine 40. The host machine 30 and the NN execution machine 40 are connected via dedicated interfaces 32 and 41, for example. A user terminal 50 can accesses the host machine 30. A user access the host machine 30 from the user terminal 50, and operates the NN execution machine 40, to thereby execute the learning processing or the production processing (inference processing) for the NN. The host machine 30 creates a NN program to be executed by the NN execution machine and transmits the NN program to the NN execution machine in accordance with the instruction from the user terminal. The NN execution machine executes the transmitted NN program, and executes the learning processing or the production processing.

The host machine 30 may be a computer, for example, and includes a host processor 31, the interface 32, a main memory 33, and a hard disk drive HDD or a solid state drive SSD 35, which is an auxiliary storage apparatus. The HDD or the SDD stores therein the NN program that executes the operation of the NN, training data used in the learning processing, and the like.

The NN execution machine 40 includes the interface 41, a NN processor 43, and a main memory 45. The NN processor 43 includes a plurality of product-sum operation units or circuits MA_0 to MA_n−1, a single or a plurality of special operation units or circuits SP_0 to SP_m−1, and a register group REG. The number of the product-sum operation units or circuits is preferably higher than the number of the special operation units or circuits. In the operation of the NN, the operation amount executed by the product-sum operation unit or circuits is generally larger than the operation amount executed by the special operation unit or circuit, and hence the number of the operation units or circuits thereof maybe different. However, this embodiment is not limited to a case where the number of the product-sum operation units or circuits is higher than the number of the special operation units or circuits. The operation unit or circuit and the operation units or circuits will be called as an operation circuit and operation circuits hereinafter.

Figure 3:
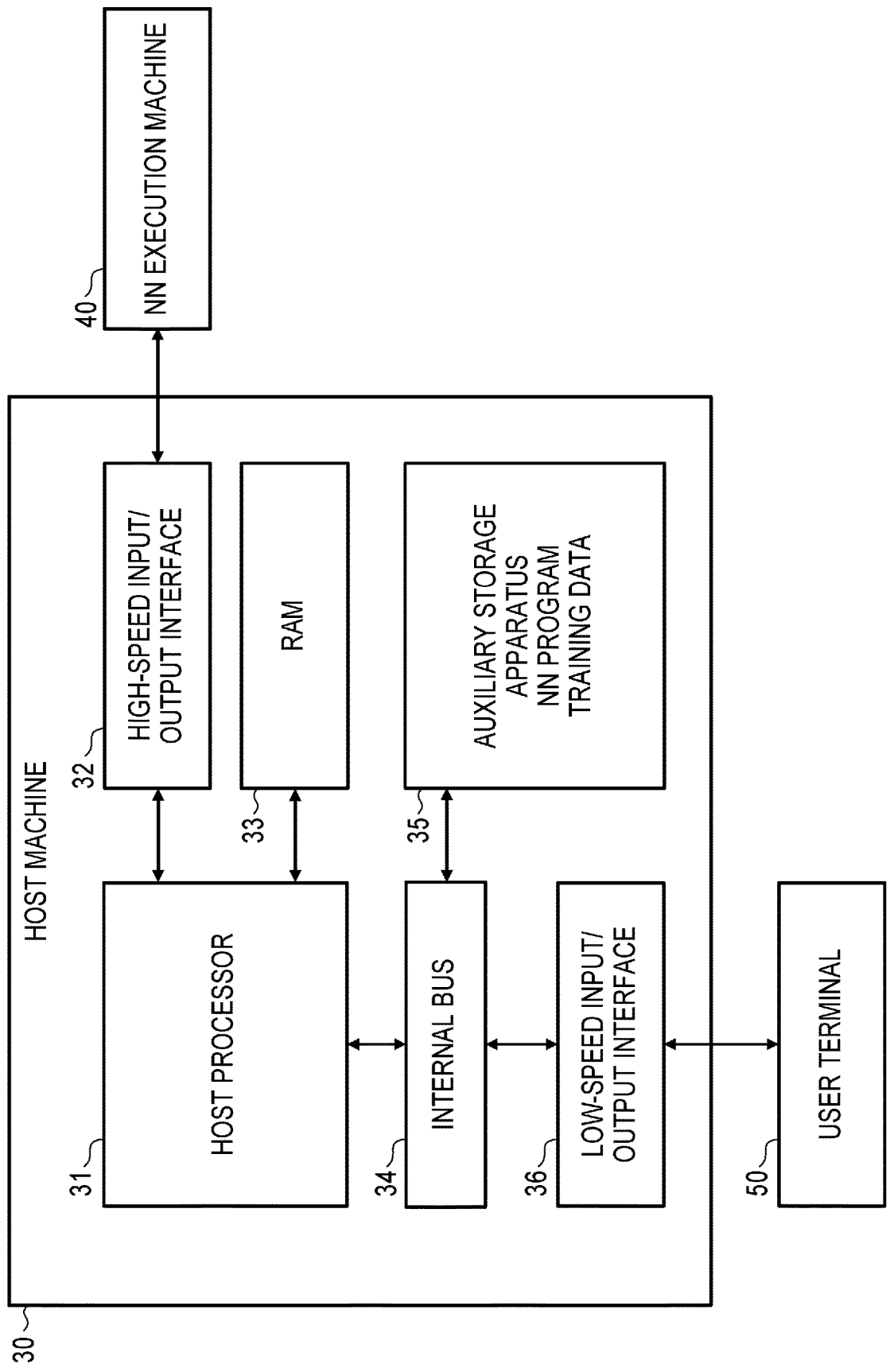
FIG. 3 illustrates a configuration example of the host machine 30.

FIG. 3 illustrates a configuration example of the host machine 30. The host machine 30 includes the host processor 31, a high-speed input/output interface 32 for performing connection with the NN execution machine 40, the main memory 33, and an internal bus 34. The host machine 30 further includes the auxiliary storage apparatus 35 such as an HDD or an SSD with large capacity connected to the internal bus 34, and a low-speed input/output interface 36 for performing connection with the user terminal 50.

The host machine 30 executes a program in the auxiliary storage apparatus 35 that is expanded in the main memory 33. The auxiliary storage apparatus 35 stores therein a NN program that executes the operation of the NN processing and the training data as illustrated in the drawings. The host processor 31 transmits the NN program and the training data to the NN execution machine, and causes the NN execution machine to execute the NN program and the training data.

The high-speed input/output interface 32 may be an interface that connects the processor 31 such as a PCI Express and the hardware of the NN execution machine to each other, for example. The main memory 33 stores therein the program and the data to be executed by the processor, and is a SDRAM, for example.

The internal bus 34 connects peripheral devices with speed lower than the processor and the processor to each other, and relays the communication therebetween. The low-speed input/output interface 36 performs connection with a keyboard and a mouse of the user terminal such as a USB, or connection with the network of Ethernet (registered trademark), for example.

Figure 4:
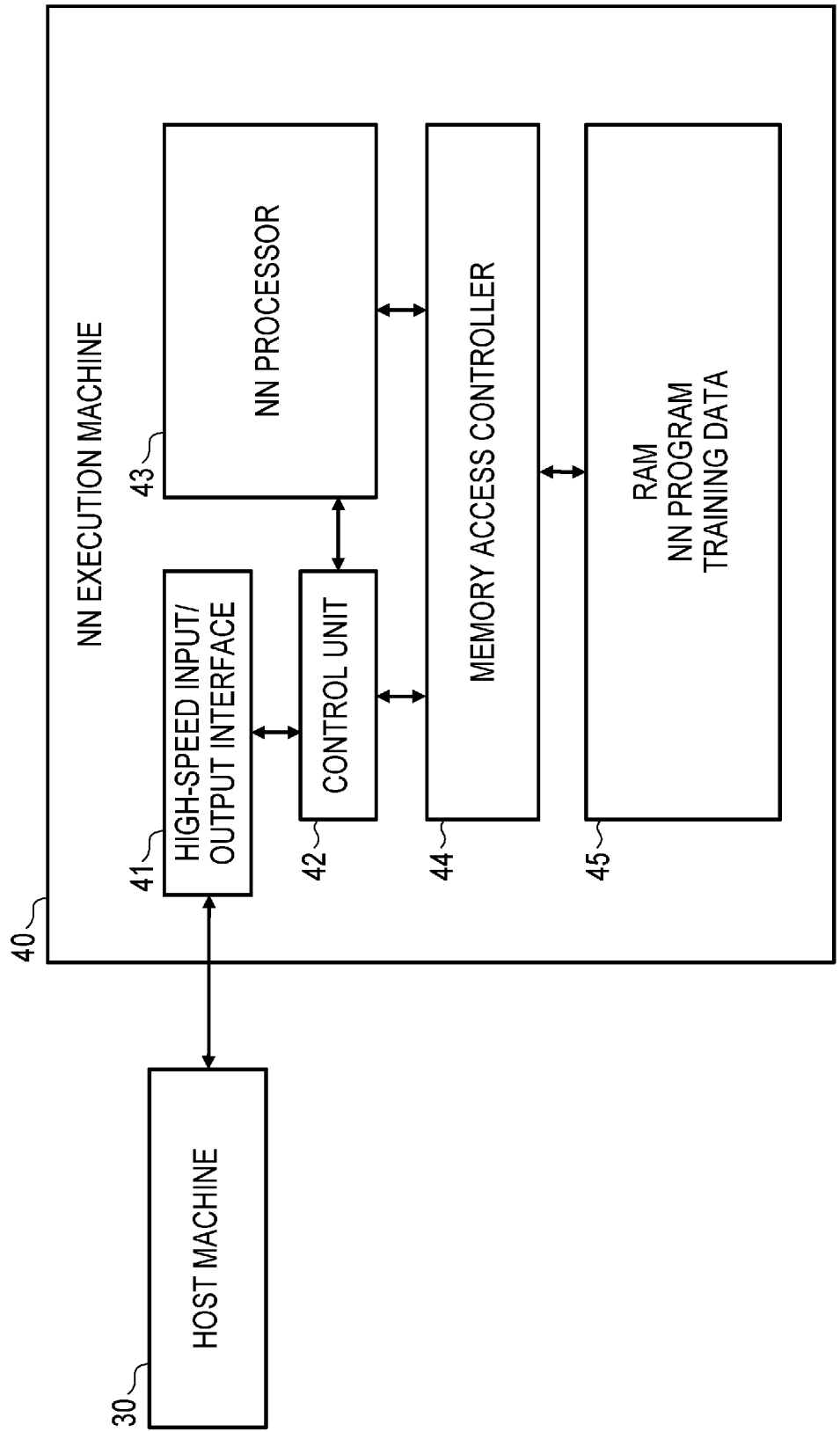
FIG. 4 illustrates a configuration example of the NN execution machine.

FIG. 4 illustrates a configuration example of the NN execution machine. The NN execution machine 40 includes the high-speed input/output interface 41 that relays the communication with the host machine 30, and a control unit or circuit 42 that executes the corresponding processing on the basis of a command and data from the host machine 30. The NN execution machine 40 includes the NN processor 43 that executes the operation of the NN, a memory access controller 44, and the internal memory 45.

The NN processor 43 executes the NN program on the basis of the NN program and the data transmitted from the host machine, to thereby execute the learning processing and the production processing. The high-speed input/output interface 41 may be a PCI Express, for example, and relays the communication with the host machine 30.

The control unit 42 stores the program and the data transmitted from the host machine in the memory 45, and instructs the NN processor to execute the program in response to a command from the host machine. The memory access controller 44 controls the access processing to the memory 45 in response to an access request from the control unit 42 and an access request from the NN processor 43.

The internal memory 45 stores therein the NN program to be executed by the NN processor, the parameter of the NN, the training data, the data to be processed, the data of the processing result, and the like. The internal memory 45 may be a SDRAM, a GDR5, which is faster, or a wideband HBM2, for example.

Figure 5:
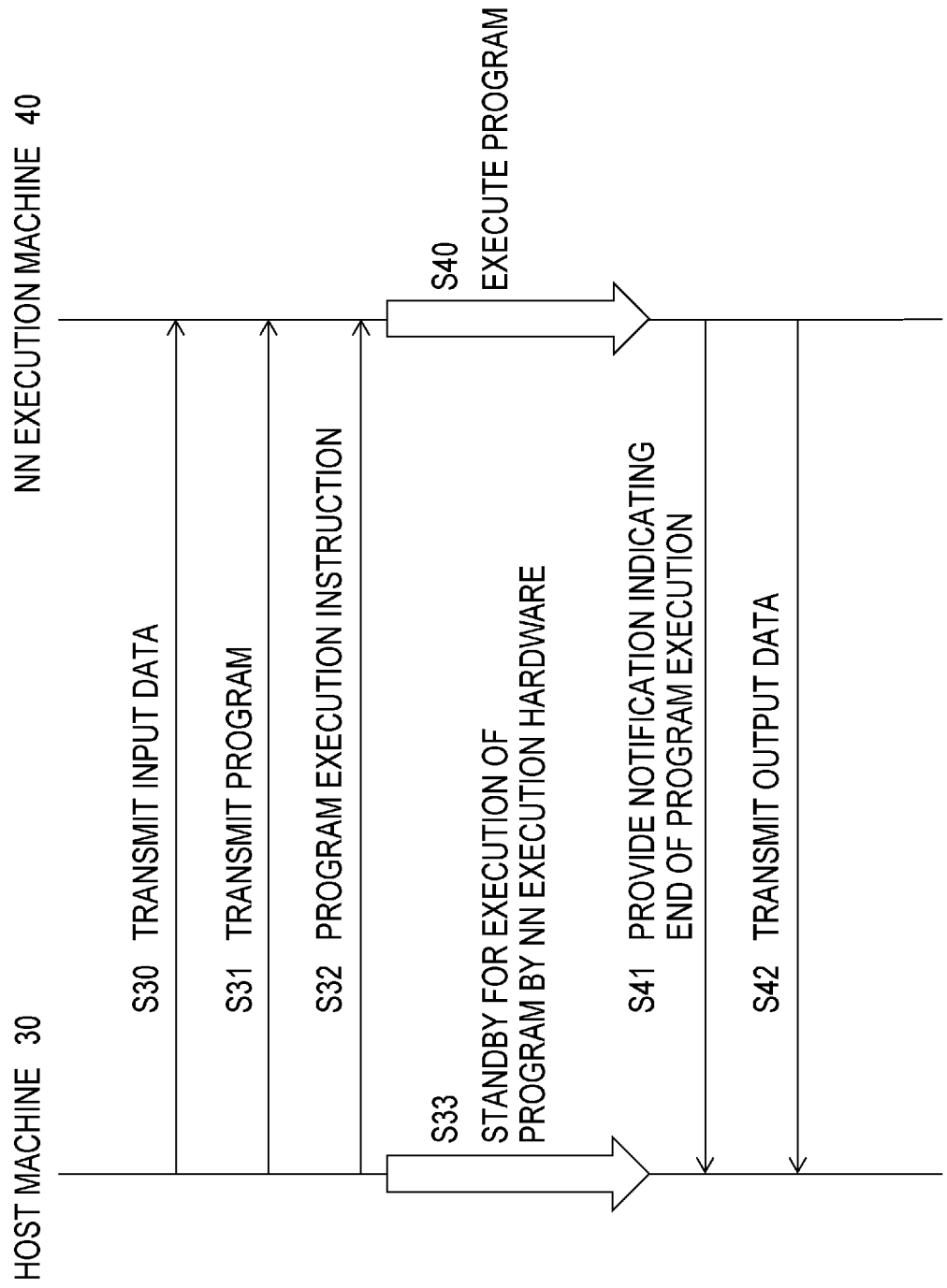
FIG. 5 illustrates a sequence chart illustrating the outline of the learning processing and the production processing performed by the host machine and the NN execution machine.

FIG. 5 is a sequence chart illustrating the outline of the learning processing and the production processing performed by the host machine and the NN execution machine. The host machine 30 transmits the training data and the input data to the NN execution machine 40 (S30), transmits the NN program that executes the learning processing or the production processing (S31), and transmits a program execution instruction (S32).

The NN execution machine 40 stores the training data, the input data, and the NN program in the internal memory 45 in response to those transmissions, and executes the NN program for the training data and the input data stored in the memory 45 in response to the program execution instruction (S40). The host machine 30 meanwhile stands by until the execution of the NN program by the NN execution machine is completed (S33).

When the execution of the NN program is completed, the NN execution machine 40 transmits a notification indicating the end of the program execution to the host machine 30 (S41), and transmits the output data to the host machine 30 (S42). When the output data is the output data of the NN, the host machine 30 executes processing of optimizing the parameter (a weight and the like) of the NN so as to reduce the error between the output data and the correct answer data. Alternatively, the NN execution machine 40 may execute the processing of optimizing the parameter of the NN. When the output data transmitted from the NN execution machine is the optimized parameter (a weight, a bias, or the like) of the NN, the host machine 30 stores therein the optimized parameter.

3. Example of Operation Unit of NN Execution Processor

Figure 6:
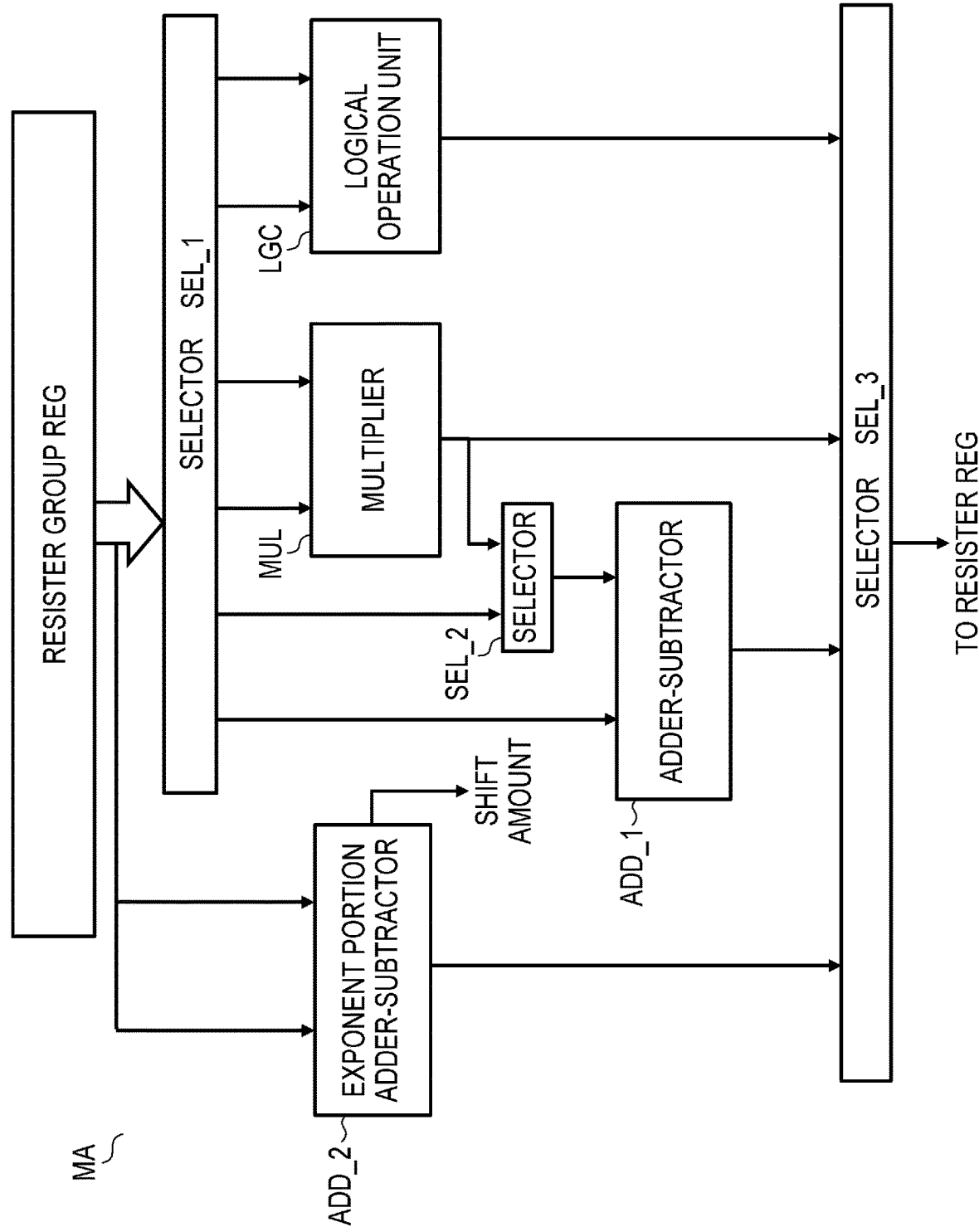
FIG. 6 illustrates a configuration example of a product-sum operation circuit MA.

FIG. 6 illustrates a configuration example of a product-sum operation circuit MA. The product-sum operation circuit MA includes a multiplier MUL, an adder-subtractor ADD_1, a logical operation circuit LGC, and a plurality of selectors SEL_1, SEL_2, and SEL_3. The product-sum operation circuit MA also includes an adder-subtractor ADD_2 that subtracts the index of the floating point number. The logical operation circuit LGC executes various logical operations such as the logical disjunction, the logical conjunction, the exclusive logical disjunction, and the like of the input values. The adder-subtractor ADD_1 executes the addition and the subtraction.

The selector SEL_1 inputs the data in the register group REG transferred from the memory into the desired operation circuits MUL, LGC, ADD_1, and ADD_2. The adder-subtractor ADD_2 performs the subtraction of the index of the floating point number, and outputs the shift amount of the bit of the significand. The adder-subtractor ADD_1 and the like perform the digit alignment of the data on the basis of the shift amount. The selector SEL_2 selects either one of the data selected by the selector SEL_1 or the output data of the multiplier MUL, and inputs the selected data into the adder-subtractor ADD_1. When the data of the multiplier MUL is selected and input into the adder-subtractor ADD_1, the adder-subtractor ADD_1 outputs the product-sum operation result. The selector SEL_3 selects the output data of the desired operation circuit, and outputs the selected data to a resister in the register group or to the memory 45.

As described above, the product-sum operation circuit MA executes non-special operations excluding special operations such as addition and subtraction, multiplication, the product-sum operation by the multiplier MUL and the adder ADD_1, the product-difference operation by the multiplier MUL and the subtractor ADD_1, and the logical operation. When the approximate calculation for the special operation is to be executed by addition and subtraction, multiplication, product-sum operation, logical operation, and the like, the product-sum operation circuit MA executes such approximate calculation.

Figure 7:
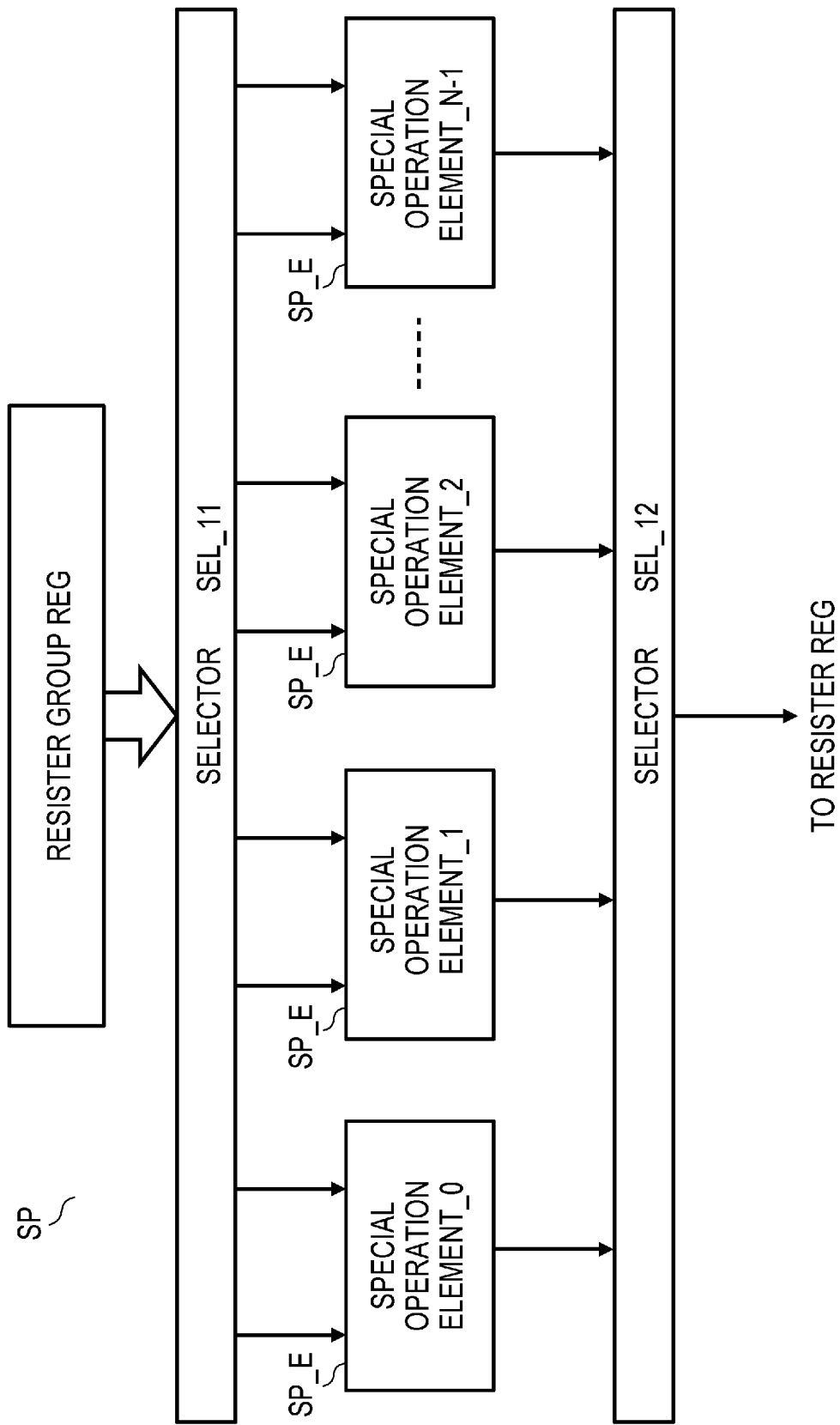
FIG. 7 illustrates a configuration example of a special operation circuit SP.

FIG. 7 illustrates a configuration example of a special operation circuit SP. The special operation circuit SP includes a selector SEL_11 on the input side, a selector SEL_12 on the output side, and a plurality of special operation elements SP_E provided between the selectors. The plurality of special operation elements SP_E execute different special operations or partially same special operations. The selector SEL_11 on the input side inputs the input data in the register group REG to desired special operation elements SP_E. The selector SEL_12 on the output side selects the outputs of desired special operation elements SP_E, and outputs the outputs to the resister and a memory (not shown), for example. As described above, the special operation circuit SP includes a plurality of special operation elements that execute a plurality of types of special operations.

4. Problem of NN Execution Processor

FIG. 8 illustrates an example of special operations included in the operations of the plurality of layers in the NN. The plurality of layers in the NN generally includes a high number of operations that are executable by the product-sum operation circuit, in particular, the product-sum operations. Meanwhile, a specific layer includes a special operation executed by the special operation circuit in addition to the operation executable by the product-sum operation circuit. Alternatively, the specific layer does not include the operation executable by the product-sum operation circuit, and includes the special operation executed by the special operation circuit.

The operations of the nine layers illustrated in FIG. 8 are described below in detail. In short, the convolution layer CONV includes a high number of product-sum operations and does not include a special operation, for example. A max pooling layer MAX_POOL includes a logical operation for comparing the data in the NN and does not include a special operation. A activation function ReLU layer includes a logical operation for performing comparison and does not include a special operation. A fully connected layer FUL_CNCT includes a high number of product-sum operations and does not include a special operation. A dropout layer DROPOUT includes multiplication and logical conjunction operation with bit mask and does not include a special operation.

Meanwhile, the softmax layer SOFTMAX includes special operations such as exponential operation $e^x$ (raising to a power) and logarithmic operation in addition to basic arithmetic operations executed by the product-sum operation circuit. The LRN layer includes special operations such as the operation of raising to the power of −¾ and division in addition to the operation of the product-sum operation circuit. Raising to the power of −¾ is executed by a combination of a square root, multiplication, and division (multiplying the value obtained by calculating a square root two times and a value obtained by calculating a square root one time together and taking the reciprocal thereof), for example. The batch normalization layer BATCH_NORM includes special operations such as raising to the power of −½ in addition to the operation of the product-sum operation circuit. The LSTM layer includes special operations such as a sigmoid function sigmoid and a hyperbolic tangent tanh.

Figure 9:
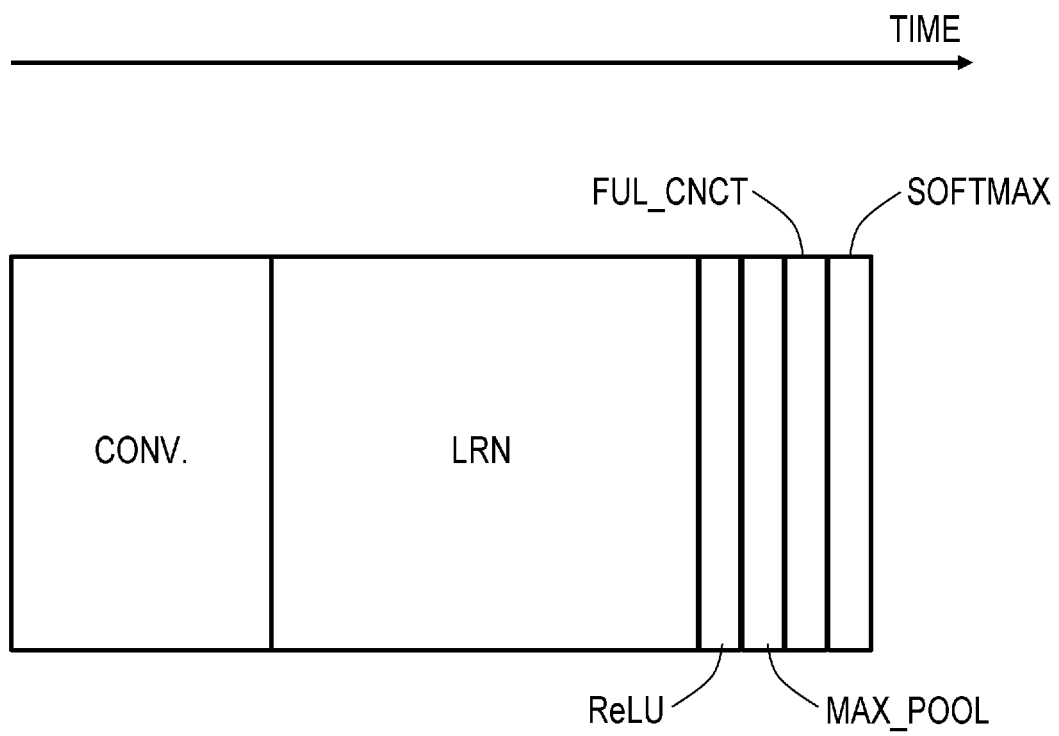
FIG. 9 illustrates an example of the operation time of the NN.

FIG. 9 illustrates an example of the operation time of the NN. For example, the breakdown of the operation time for each layer when the NN in FIG. 1 executes the learning processing is illustrated. The horizontal axis is the time axis.

According to the example of the operation time of the NN illustrated in FIG. 9, the operation time of the convolution layer CONV that performs the convolution operation includes a large amount of product-sum operation accounts for about 30% of the entire operation time. The operation time of the activation function layer ReLU, the max pooling layer MAX_POOL, the fully connected layer FUL_CNCT, the softmax layer SOFTMAX, and the like is not so long.

Meanwhile, the operation time of the LRN layer accounts for about 50% of the entire operation time. As a result, the entire operation time is long. In such case, the operation time of the LRN layer including special operations is the bottleneck of the entire operation time. This is because, for example, the NN processor only has a low number of special operation circuits SP included therein as compared to the product-sum operation circuits MA, and hence the processing capacity of the special operation is low. Therefore, when the special operation circuit SP executes the raising to a power that is the special operation of the LRN layer, the execution time of the LRN layer becomes relatively long as illustrated in FIG. 9, which becomes a bottleneck in the reduction of the operation time.

In particular, in the learning processing, the operation of the NN is executed for a large amount of training data. Thus, the execution time of the NN per one training data needs to be reduced (may be) in order to reduce the long operation time for the learning processing to be completed. The execution time of the NN is also desired to be reduced when a high number of users request inference for the input data by the operation of the NN in the inference processing (production processing) after the learning processing.

5. Outline of NN Processor in this Embodiment

Figure 10:
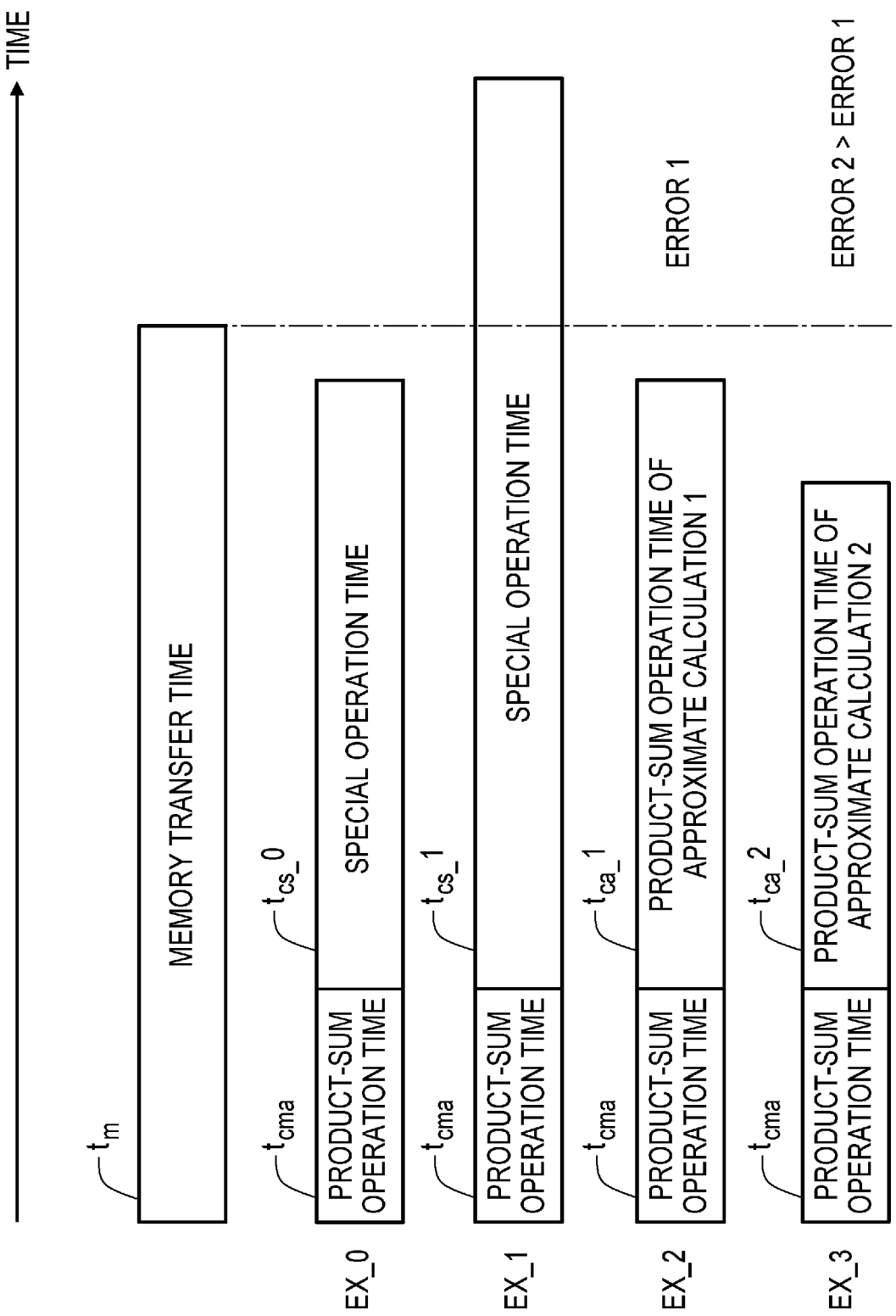
FIG. 10 illustrates memory transfer time tm that is necessary for the operation of a certain layer.

FIG. 10 illustrates a method for reducing the operation time of a specific layer in the NN that is the bottleneck. The horizontal axis in FIG. 10 is the time axis. When the operation of the specific layer in the NN is executed, operation processing by the operation circuit and memory transfer processing occur. The memory transfer processing is processing of transferring the input data for the operation to the resister in the processor from the memory, and transferring intermediate data and the output data that are the operation results to the memory from the resister.

FIG. 10 illustrates memory transfer time $t_m$ that is necessary for the operation of a certain layer. The operation processing EX_0 and EX_1 includes a non-special operation executed by the product-sum operation circuit, and a special operation executed by the special operation circuit included in the operation of a certain layer. The operation time of the operation processing EX_0 is the total operation time $t_{cma}+t_{cs\_}0$ that is the sum of operation time $t_{cma}$ of the non-special operation executed by the product-sum operation circuit, and operation time $t_{cs\_}0$ by the special operation circuit. In the operation processing EX_0, the operation time $t_{cs\_}0$ by the special operation circuit is short, and the operation time $t_{cma}+t_{cs\_}0$ is shorter than the memory transfer time $t_m$. Meanwhile, the operation time of the operation processing EX_1 is $t_{cma}+t_{cs\_}1$. In the operation processing EX_1, the operation time $t_{cs\_}1$ by the special operation circuit is long, and the operation time $t_{cma}+t_{cs\_}1$ is longer than the memory transfer time $t_m$.

The memory transfer and the operations by the operation circuits are parallelly executed. Therefore, the memory transfer time hides the operation time of the operation circuit when the operation time of the operation circuit of the layer is equal to or less than the memory transfer time as in operation processing EX_0. Thus, the operation time of the layer does not become the bottleneck of the operation time of the entire NN. In this case, the memory transfer time becomes the bottleneck.

When the operation time of the operation circuit of the layer is not equal to or less than the memory transfer time as in the operation processing EX_1, the operation time of the operation circuit is not hidden in the memory transfer time. Thus, the operation time of the layer becomes bottleneck of the operation time of the entire NN.

Meanwhile, operation processing EX_2 and EX_3 execute the special operation of the layer by performing approximate calculation for the special operation with the product-sum operation circuit instead of executing the special operation by the special operation circuit. The operation processing EX_2 executes approximate calculation 1 with the product-sum operation circuit, and the operation processing EX_3 executes approximate calculation 2 with the product-sum operation circuit.

Therefore, the operation time of the operation processing EX_2 is a sum $t_{cma}+t_{ca\_}1$ of the operation time $t_{cma}$ of the non-special operation executed by the product-sum operation circuit and operation time $t_{ca\_}1$ of the approximate calculation 1 executed by product-sum operation circuit. Similarly, the operation time of the operation processing EX_3 is a sum $t+t_{ca\_}2$ of the operation time $t_{cma}$ of the non-special operation executed by the product-sum operation circuit and operation time $t_{ca\_2}$ of the approximate calculation 2 executed by the product-sum operation circuit. The operation time $t_{cma}+t_{ca\_1}$ and the operation time $t_{cma}+t_{ca\_2}$ are both shorter than the memory transfer time $t_m$.

The NN processor in this embodiment selects the operation processing EX_0 as the operation method when the time $t_{cma}+t_{cs\_0}$ when the operation of the layer including the special operation in the NN is performed by the operation processing EX_0 is equal to or less than the memory transfer time $t_m$. In this case, the special operation of the layer is operated by the special operation circuit.

Meanwhile, the NN processor selects either one of the operation processing EX_2 and EX_3 as the operation method when the time $t_{cma}+t_{cs\_1}$ when the operation of the layer including the special operation in the NN is performed by the operation processing EX_1 is not equal to or less than the memory transfer time $t_m$. In this case, the NN processor executes the operation of the layer with the selected operation method, and uses a general-purpose product-sum operation circuit for the special operation without using the special operation circuit. The product-sum operation circuit can generally complete one instruction with one clock cycle. A high number of product-sum operation circuits are provided, and hence the execution time $t_{ca}$ when the product-sum operation circuits execute the approximate calculation is shorter than the execution time $t_{cs}$ for when the special operation circuits execute the special operation. Therefore, the total operation time $t_{cma}+t_{ca}$ of the layer in EX_2 and EX_3 becomes shorter than the memory transfer time $t_m$, and the memory transfer time can hide the operation execution time.

The NN processor in this embodiment selects the operation processing EX_2 of which error in the approximate calculation is smaller out of the operation processing EX_2 and EX_3. The approximate calculation generally tends to have less error as the number of operations increases. Thus, the NN processor selects the operation processing, which performs approximate calculation with as less error as possible and in which the operation time $t_{cma}+t_{ca}$ is shorter than the memory transfer time $t_m$.

As described above, when the execution time of the layer when the operation including the special operation of the layer is executed by the special operation circuit is equal to or less than the memory transfer time (when the memory transfer is the bottleneck), the special operation can be operated with a higher accuracy with the operation of the special operation circuit than with the approximate calculation of the product-sum operation circuit. Thus, in this case, the NN processor performs operation with the special operation circuit.

Meanwhile, when the execution time of the layer when the operation including the special operation of the layer is executed by the special operation circuit is not equal to or less than the memory transfer time (when the operation time of the operation circuit is the bottleneck), the NN processor performs the special operation with the approximate calculation by the product-sum operation circuit. As a result, the NN processor can make the operation time of the layer to be equal to or less than the memory transfer time, and the operation of the NN can be increased in speed.

It is preferable to select an approximate calculation with an accuracy that is as high as possible out of the approximate calculations whose operation time of the layer is equal to or less than the memory transfer time.

The execution time of the operation of the layer performed by the operation circuit differs depending on the operation content and the amount of data of the NN, and the performance of the processor. The memory transfer time differs depending on the amount of data of the NN and the memory transfer capacity between the processor and the memory.

The NN processor determines whether to execute the special operation of the layer by the special operation circuit or to execute the special operation of the layer with the approximate calculation by the product-sum operation circuit in a step of executing the first learning processing in the learning of the NN. In the learning processing thereafter, the NN processor executes the operation of the layer by the method determined first without performing the determining processing again. The NN processor determines again whether to execute the special operation of the layer by the special operation circuit or to execute the special operation of the layer with the approximate calculation by the product-sum operation circuit in the first production processing step in the production processing (in the inference). In the production processing thereafter, the NN processor executes the operation of the layer by the method determined first without performing the determining processing again. This is because different processors may execute the operations of the NN for the learning and the production.

Figure 11:
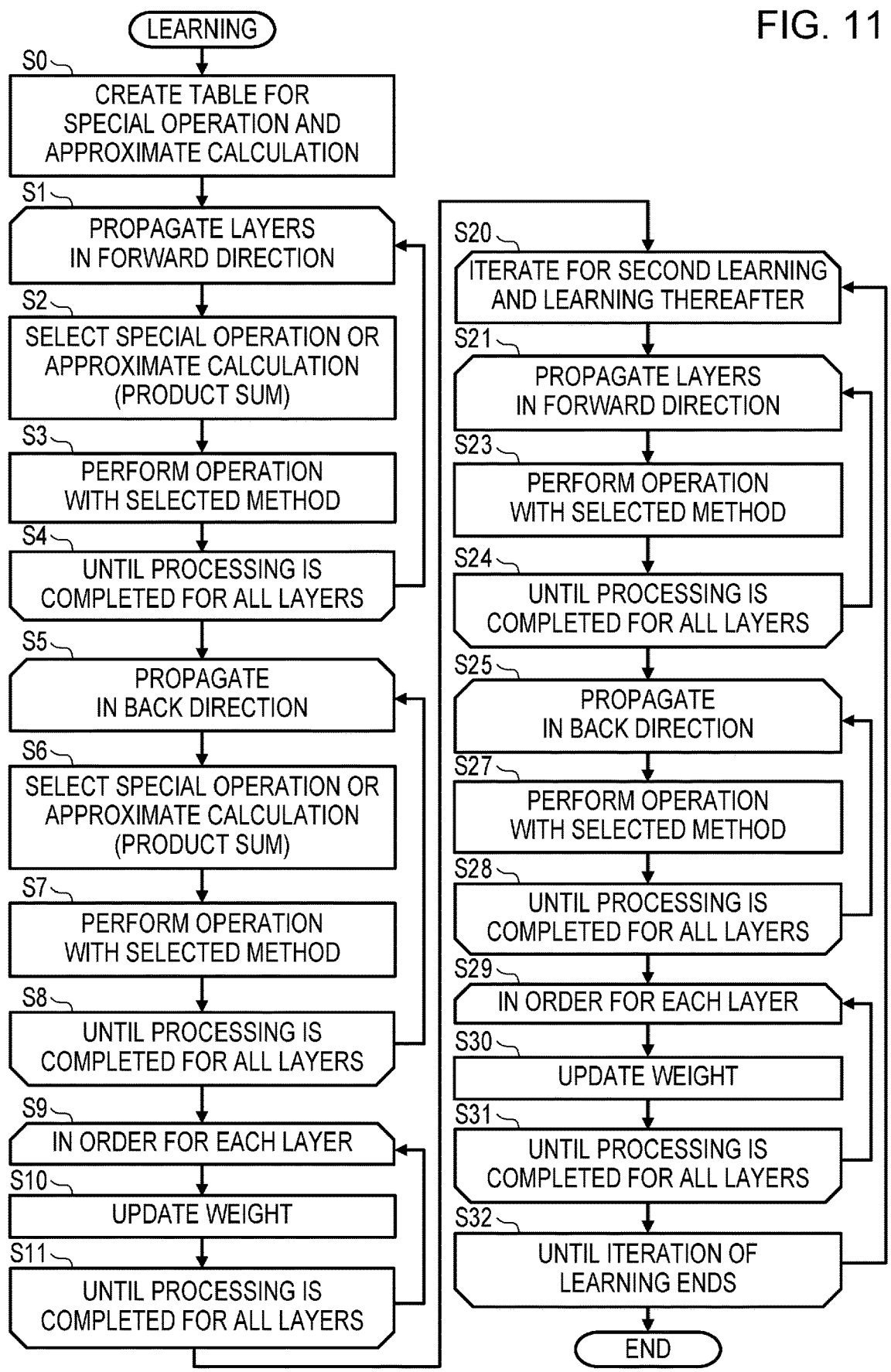
FIG. 11 is a flow chart illustrating the processing at the time of learning in the NN processor in this embodiment.

FIG. 11 is a flow chart illustrating the processing at the time of learning in the NN processor in this embodiment. A table for the special operation and the approximate calculation is created in advance before the NN processor executes the learning processing (S0). As described in detail below, the table for the special operation and the approximate calculation includes the number of instructions for the special operation element and the number of clock cycles of the special operation element when the special operation circuit executes the special operation, and the number of instructions for the product-sum operation circuit and the number of clock cycles of the product-sum operation circuit when the product-sum operation circuit executes the special operation with the approximate calculation. The table preferably also includes the error of each approximate calculation. The clock number of cycles described above is performance information of the NN processor, and hence may be prepared in advance as the performance information of the NN processor besides the table for the special operation and the approximate calculation.

In the learning processing, the NN processor executes first learning steps S1 to S11, and executes iteration steps S20 to S32 for the second learning and the learning thereafter. In the first learning steps S1 to S11, the NN processor performs processes S2 and S3 in each layer while propagating the layers in the NN in the forward direction (S1). When the operation of a layer includes a special operation during the propagation, the NN processor selects whether to perform the special operation by the special operation circuit or to perform the special operation with the approximate calculation by the product-sum operation circuit with the method described in FIG. 10 (S2). Then, the NN processor executes the special operation included in the operation of the layer with the selected method (S3). The NN processor repeats the processing described above until the processing is completed for all the layers (S4).

Next, the NN processor performs processes S6 and S7 in each layer while propagating the layers in the NN in the opposite direction (S5). When the operation of a layer includes a special operation during the propagation, the NN processor selects whether to perform the special operation by the special operation circuit or to perform the special operation with the approximate calculation by the product-sum operation circuit with the method described in FIG. 10 (S6). Then, the NN processor executes the special operation included in the operation of the layer with the selected method (S7). The NN processor repeats the processing described above until the processing is completed for all the layers (S8). Note that in the NN propagation in the opposite direction, the NN processor calculates the difference between the parameter before the update and the parameter after the update that reduces the error in each layer while propagating the difference (error) between the output value and the teaching (correct) data in the opposite direction of the NN.

Then, the NN processor performs process S10 while propagating the layers in the NN in the forward direction (S9), while propagating, the NN processor updates the parameters of the layers such as the weight and the bias in accordance with the difference in the parameters calculated while back propagation (S10). The update processing for the parameters is also performed until the processing is completed for all the layers (S11).

In the iteration steps S20 to S32 for the second learning and the learning thereafter, the NN processor performs process S23 while forward propagating (S21). While forward propagating, the NN processor executes the operations of the layers with the selected method (S23) until the operations are completed for all the layers (S24). Then, the NN processor performs process S27 while back propagating (S25). While back propagating, the NN processor executes the operations of the layers with selected method (S27) until the operations are completed for all the layers (S28). Then, the NN processor performs process S30 while propagating to the layers in the NN in the forward direction (S29). While forward propagating, the NN processor updates parameters such as the weight and the bias in the layers in accordance with the difference in the parameters calculated while the back propagation (S30) until the update is completed for all the layers (S31). The processing described above is repeated until the iteration of the learning ends (S32).

The NN processor executes the NN program transmitted from the host machine to perfume the processing in FIG. 11. The NN program includes determining code (instruction) for determining whether to perform the special operation of the operation of the layer by the special operation circuit or to perform the special operation of the operation of the layer with the approximate calculation by the product-sum operation circuit, a code for performing the special operation of the operation of the layer by the special operation circuit, and a code for performing the special operation of the operation of the layer with the approximate calculation by the product-sum operation circuit. The determining code is executed in the initial learning step, and is not executed in the learning steps thereafter. The table for the special operation and the approximate calculation is created, the determining code is executed to determine whether the special operation is to be performed by the special operation circuit or to be performed with the approximate calculation by the product-sum operation circuit each time the NN processor changes.

Figure 12:
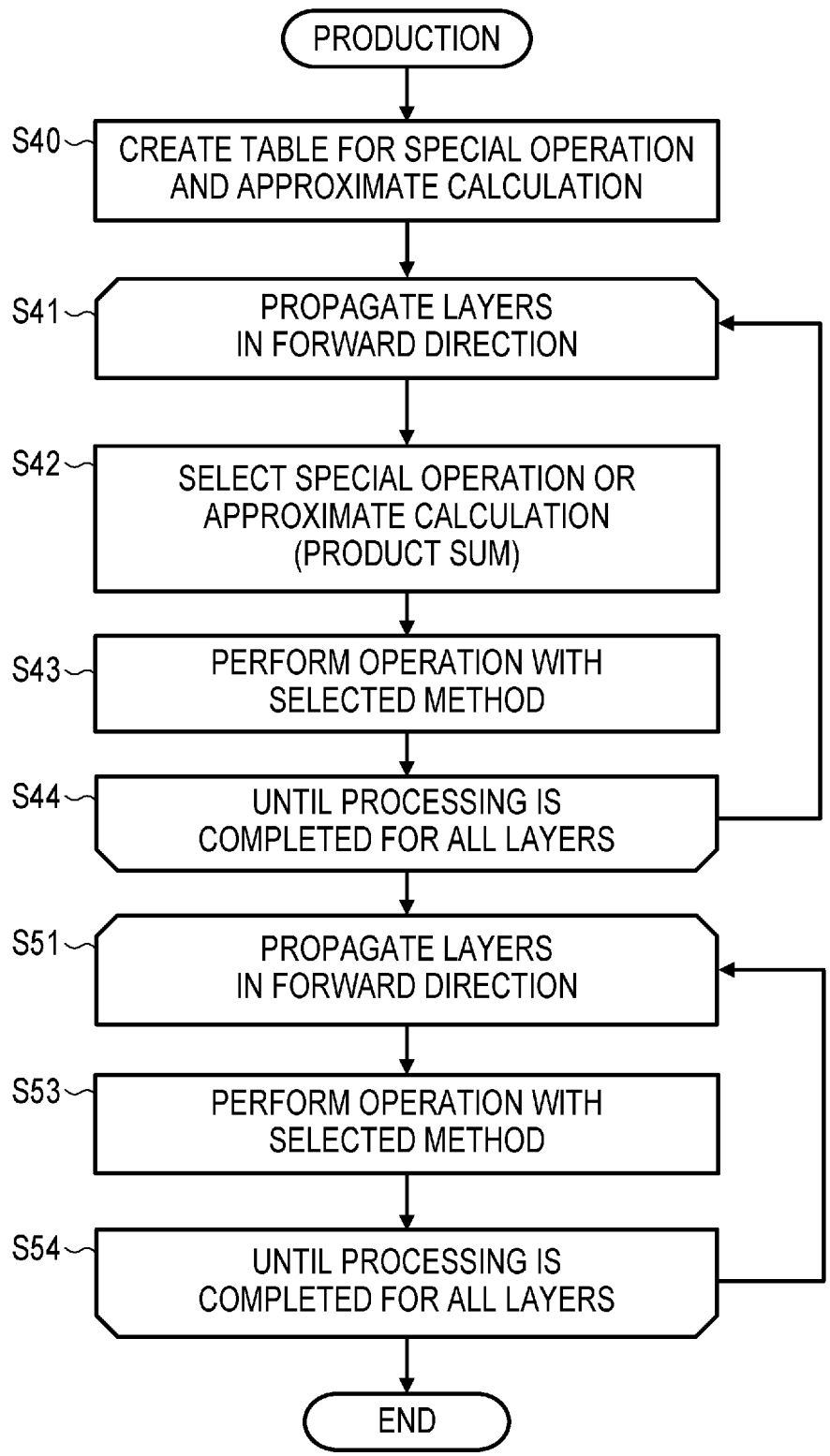
FIG. 12 is a flow chart illustrating the processing during the production (inference) in the NN processor in this embodiment.

FIG. 12 is a flow chart illustrating the processing during the production (inference) in the NN processor in this embodiment. A table for the approximate calculation for the special operation is created in advance before the NN processor executes the production processing. This is because the NN processor at the time of the production may be different from the NN processor at the time of the learning.

In the production processing, the NN processor executes first production steps S41 to S44, and executes production steps S51 to S54 for the second production and productions thereafter. In the first production steps S41 to S44, the NN processor performs the processes S42 and S43 while propagating the layers in the NN in the forward direction (S41). When the operation of a layer includes a special operation during the propagation, the NN processor selects whether to perform the special operation by the special operation circuit or to perform the special operation with the approximate calculation by the product-sum operation circuit with the method described in FIG. 10 (S42). Then, the NN processor executes the special operation included in the operation of the layer with the selected method (S43). The NN processor repeats the processing described above until the processing is completed for all the layers (S44).

In the production steps S51 to S54 for the second production and productions thereafter, the NN processor performs the process S53 while propagating the layers in the NN in the forward direction (S51). The NN processor layer executes the special operation included in the operation with the selected method during the propagation (S53). The NN processor repeats the processing described above until the processing is completed for all the layers (S54).

Figure 13:
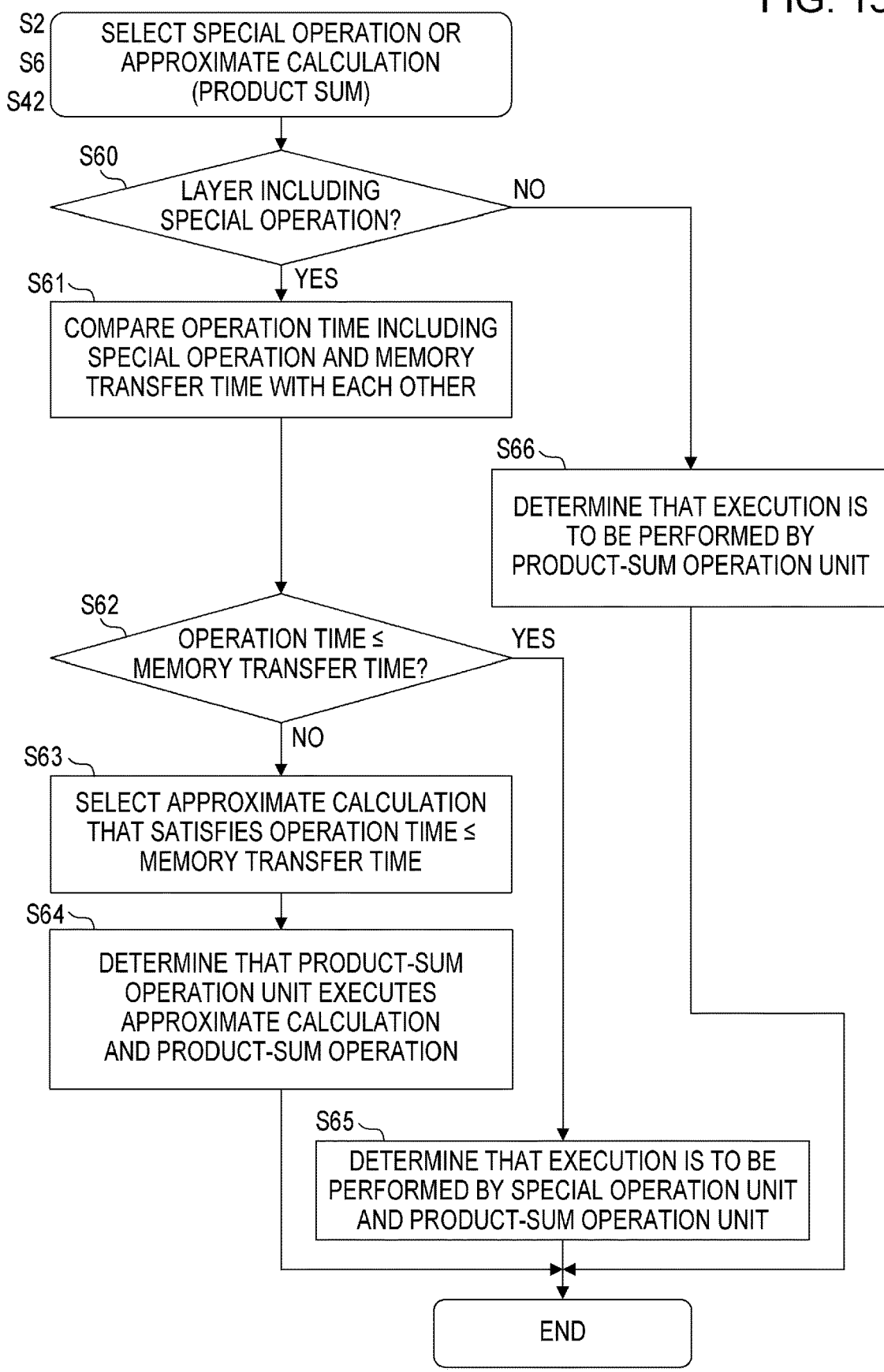
FIG. 13 is a flow chart of selecting processing of selecting whether to perform the special operation by the special operation circuit or to perform the special operation with the approximate calculation by the product-sum operation circuit.

6. Selection of Whether to Perform Special Operation by Special Operation Unit or to Perform Special Operation with Approximate Calculation by Product-Sum Operation Unit FIG. 13 is a flow chart of selecting processing of selecting whether to perform the special operation by the special operation circuit or to perform the special operation with the approximate calculation by the product-sum operation circuit. The selecting processing is the processing in steps S2, S6, and S42 in FIG. 11 and FIG. 12.

The NN processor determines whether each layer is a layer including a special operation (S60). When the layer does not include a special operation (NO in S60), the NN processor determines that the operation of the layer is to be executed by the product-sum operation circuit (S66). When the layer includes a special operation (YES in S60), the NN processor compares the operation time of the layer when the special operation included in the operation of the layer is executed by the special operation circuit, and the memory transfer time of the data necessary for the operation of the layer (S61). The comparison is described in FIG. 14. The NN processor determines whether the operation time of the layer when the special operation is executed by the special operation circuit is equal to or less than the memory transfer time (S62). When the operation time of the layer is equal to or less than the memory transfer time (YES in S62), the NN processor determines that the special operation is to be executed by the special operation circuit and the non-special operation is to be executed by the product-sum operation circuit for the operation of the layer (S65). When the operation time of the layer is not equal to or less than the memory transfer time (NO in S62), the NN processor determines that the special operation is to be executed with the approximate calculation by the product-sum operation circuit and the non-special operation is to be executed by the product-sum operation circuit for the operation of the layer (S64).

The NN processor desirably selects the approximate calculation with the minimum error out of the approximate calculations with which the operation time becomes equal to or less than the memory transfer time (S63).

Figure 14:
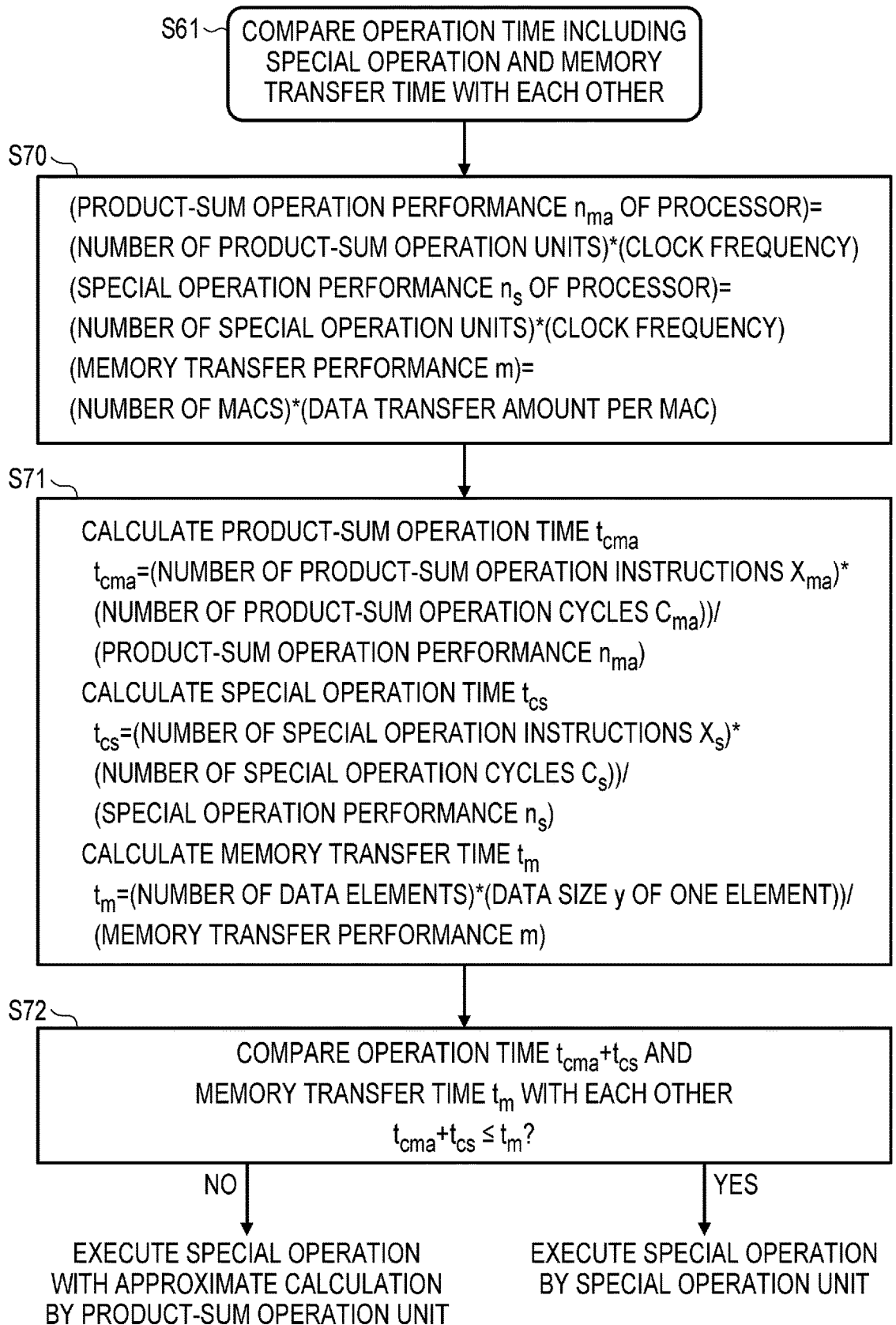
FIG. 14 is a flow chart of comparing processing S61 of comparing the operation time of the layer and the memory transfer time with each other when the special operation is performed by the special operation circuit.

FIG. 14 is a flow chart of comparing processing S61 of comparing the operation time of the layer when the special operation is performed by the special operation circuit and the memory transfer time with each other. The operation time of the layer depends on the operation content of the NN and the performance of the NN processor. The performance of the NN processor includes the product-sum operation performance $n_{ma}$ that is the performance of the product-sum operation circuit and the special operation performance $n_s$ that is the performance of the special operation circuit. The operation content of the NN includes the number of the basic arithmetic operations and the number of the special operations necessary for the operation of the NN, and the number of operation instructions (the number of times of the instruction execution by the operation circuits) when those number of operations are executed by the product-sum operation circuit and the special operation circuit. Meanwhile, the memory transfer time depends on data transfer amount (byte) and the memory bandwidth (the amount of data (byte/sec) per unit time in the memory access). The data transfer amount is based on the operation content of the NN, and the memory bandwidth is based on the performance of the NN processor.

In this embodiment, the number of mean clock cycles $C_s$ required for one instruction is different for a plurality of types of special operation elements in the special operation circuit, and hence a product-sum operation performance $n_{ma}$ and a special operation performance $n_s$ are defined as the product of the number of the operation circuits and the clock frequency. Operation time $t_{cma}$ of the product-sum operation circuit and operation time $t_{cs}$ of the special operation circuit are calculated by multiplying the number of the operation instructions $X_{ma}$ and $X_s$ of the operation circuits by ((mean number of clock cycles (number of operation cycles) $C_{ma}$ per instruction)/(operation performance $n_{ma}$)/) and ((mean number of clock cycles (number of operation cycles) $C_s$ per instruction)/(operation performance $n_s$)) respectively.

As illustrated in FIG. 13, the NN processor calculates the product-sum operation performance $n_{ma}$, the special operation performance $n_s$, and the memory transfer performance m of the processor as follows (S70). Here, the memory access controller is represented by MAC.

(product-sum operation performance $n_{ma}$)=(number of product-sum operation circuits)*(clock frequency)

(special operation performance $n_s$)=(number of special operation circuits)*(clock frequency)

(memory transfer performance $m$)=(number of MACs)*(data transfer amount per MAC)

Next, the NN processor calculates product-sum operation time $t_{cma}$, special operation time $t_{cs}$, and the memory transfer time $t_m$ as follows (S71).

(product-sum operation time $t_{cma}$)=((number of product-sum operation instructions $X_{ma}$)*(number of product-sum operation cycles $C_{ma}$))/ (product-sum operation performance $n_{ma}$)

(special operation time $t_{cs}$)=Σ((number of special operation instructions $X_s$)*(number of special operation cycles $C_s$))/(special operation performance $n_s$)

(memory transfer time $t_m$)=(memory transfer amount $y$)(=(number of data elements)*(data size of one element))/(memory transfer performance $m$).

Here, Σ((number of special operation instructions $X_s$)*(number of special operation cycles $C_s$)) represents the total of ((number of special operation instruction $X_s$)*(number of special operation cycles $C_s$)) for each of a plurality of special operation elements when the special operation is executed by the plurality of special operation elements.

Then, the NN processor compares the operation time (product-sum operation time $t_{cma}$+special operation time $t_{cs}$) and the memory transfer time $t_m$, necessary for the operations of the layers obtained above, with each other, and determines whether the operation time is within the memory transfer time ($t_{cma}+t_{cs} \leq t_m$) (S72). The NN processor determines that the special operation of the operation of the layer is to be executed by the special operation circuit when $t_{cma}+t_{cs} \leq \tau_m$ is true (YES), and the special operation of the operation of the layer is to be executed with the approximate calculation by the product-sum operation circuit when $t_{cma}+t_{cs} \leq t_m$ is false (NO).

Note that the operation of the layer includes cases with only non-special operations, and cases where non-special operations and special operations are mixed, as described below with specific examples.

When the operation of the layer includes non-special operations and special operations in a mixed manner:

(1) the operation time necessary for the operation of the layer is (product-sum operation time $t_{cma}$ of non-special operation)+(special operation time $t_{cs}$ of special operation) when the special operation is executed by the special operation circuit; and (2) the operation time necessary for the operation of the layer is (product-sum operation time of non-special operation)+(product-sum operation time of approximate calculation) $t_{cma}$ when the special operation is executed with the approximate calculation by product-sum operation circuit.

7. Selection of Approximate Calculation

Figure 15:
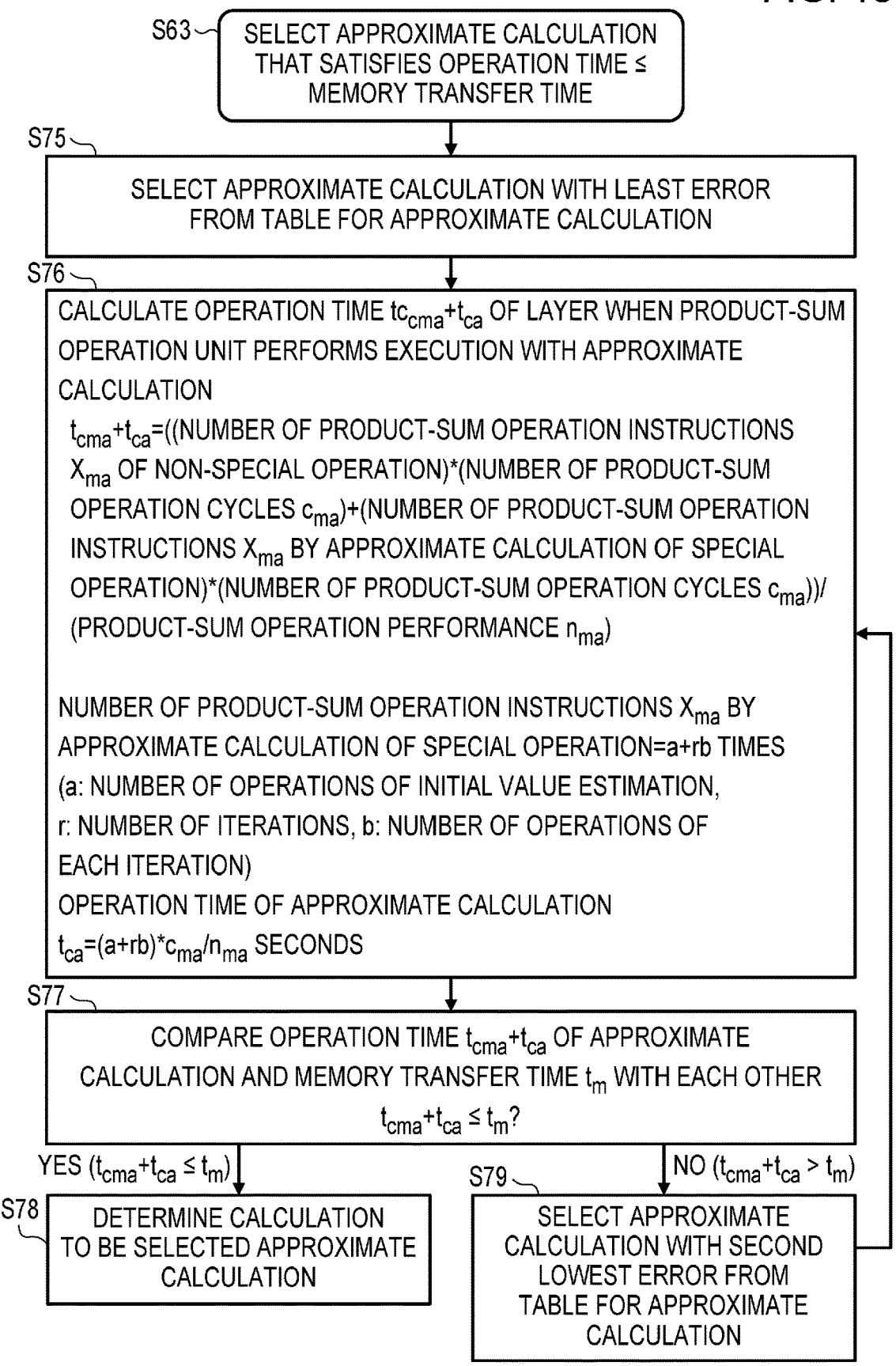
FIG. 15 illustrates a flowchart of processing S63 of selecting the approximate calculation.

FIG. 15 illustrates a flowchart of processing S63 of selecting the approximate calculation. There are a plurality of approximate calculations for the special operation. For example, Newton's method calculates an approximate value by performing initial value estimation that estimates the initial value with a predetermined operation, and convergent operation of repeating approximate calculation on the basis of the initial value. The error generally decreases as the number of the convergent operations increases, but the operation time accordingly increases.

Thus, in this embodiment, the table for the special operation and the approximate calculation that is prepared in advance stores therein respective number of product-sum operation instructions obtained by executing the plurality of approximate calculations by the NN processor. The table also stores therein the mean number of cycles (normally one cycle) for one instruction of the product-sum operation circuit, the mean number of cycles for one instruction of the special operation element, and the error of the approximate calculation. The error of the approximate calculation is also obtained by an experiment.

As Illustrated in FIG. 15, in the processing of selecting the approximate calculation, the NN processor selects the approximate calculation with the least error from the table for the special operation and the approximate calculation (S75).

Next, the NN processor calculates the operation time $t_{cma}+t_{ca}$ of the layer when the special operation is executed with the selected approximate calculation by the product-sum operation by the calculating expression as follows (S76).

$t_{cma}+t_{ca}$={(number of product-sum operation instructions $X_{ma}$ of non-special operation)*(number of product-sum operation cycles $C_{sa}$)+(number of product-sum operation instructions $X_{ma}$ by approximate calculation of special operation)* (number of product-sum operation cycles $C_{sa}$) }/(product-sum operation performance $n_{ma}$)

The number of product-sum operation instructions $X_{ma}$ by the approximate calculation for the special operation is calculated by the following expression:

$$X_{ma}=a+r*b$$

where a represents the number of operations for the initial value estimation of the approximate calculation, b represents the number of operations for the convergent operation, and r represents the number of iterations of the convergent operation.

The initial value estimation of the approximate calculation is performed by an initial value estimation similar to the algorithm of Quake, for example. In this case, an accurate approximate solution is obtained for the index part of the floating point number of the input with only the bitwise calculation. Meanwhile, for the significand part (K bit), all combinations ($2^{K+1}$ combinations) for K+1 bits including the sign bit are experimented by the NN processor in advance, and the initial value with the least error is determined. The number of operations required for obtaining the initial value is a. For more detail, see http://takashiijiri.com/study/miscs/fastsqrt.html, for example.

Examples of the convergent operations and the number of the iterations are two times for the third order Householder method, four times for the Newton's method, and one time each for the third order Householder method and the fourth order Householder method, for example.

Next, the NN processor compares the total operation time $t_{cma}+t_{ca}$ of the layer when the operation is executed with the approximate calculation by the product-sum operation circuit and the memory transfer time $t_m$ with each other (S77). The NN processor determines the approximate calculation to be the selected approximate calculation (S78) when $t_{cma}+t_{ca} \leq t_m$ is true (YES). When $t_{cma}+t_{ca} \leq t_m$ is false (NO), the NN processor selects the approximate calculation with the second lowest error from the table for the special operation and the approximate calculation (S79), and repeats steps S76 and S77.

The processing of selecting the approximate calculation described above is based on the fact that the error of the approximate calculation decreases as the number of times by which the convergent operation of the approximate calculation is repeated increases and the operation time increases. When $t_{cma}+t_{ca} \leq t_m$ is satisfied, the memory transfer time hides the operation time of the layer executed with the approximate calculation by the product-sum operation circuit, and the operation time does not become the bottleneck. The error differs depending on the type of the approximate calculation, and hence the approximate calculation with the minimum error is preferably selected within the range in which the abovementioned condition is satisfied.

8. Examples of Operations of Layers in NN, Number of Operations, Number of Operation Instructions, and Data Amount Next, for a specific example of the NN in FIG. 1, examples of the operations of the layers, the number of operations, the number of operation instructions, and the data mount are explained, and whether each of the layers includes a special operation as illustrated in FIG. 8, and the special operations included in each of the layers when including a special operation are explained. The operation example of the NN in FIG. 1 described below is based on the source code of the program of AlexNet in ImageNet Classification with Deep Convolutional Neural Networks, Alex Krishwvsky, Ilya Sutskever, Geoffrey E. Hinton, (https://papers.nips.cc/paper/4824-imagenet-classification-with-deep-convolutional-neural-networks.pdf).

Convolution Layer CONV

Figure 16:
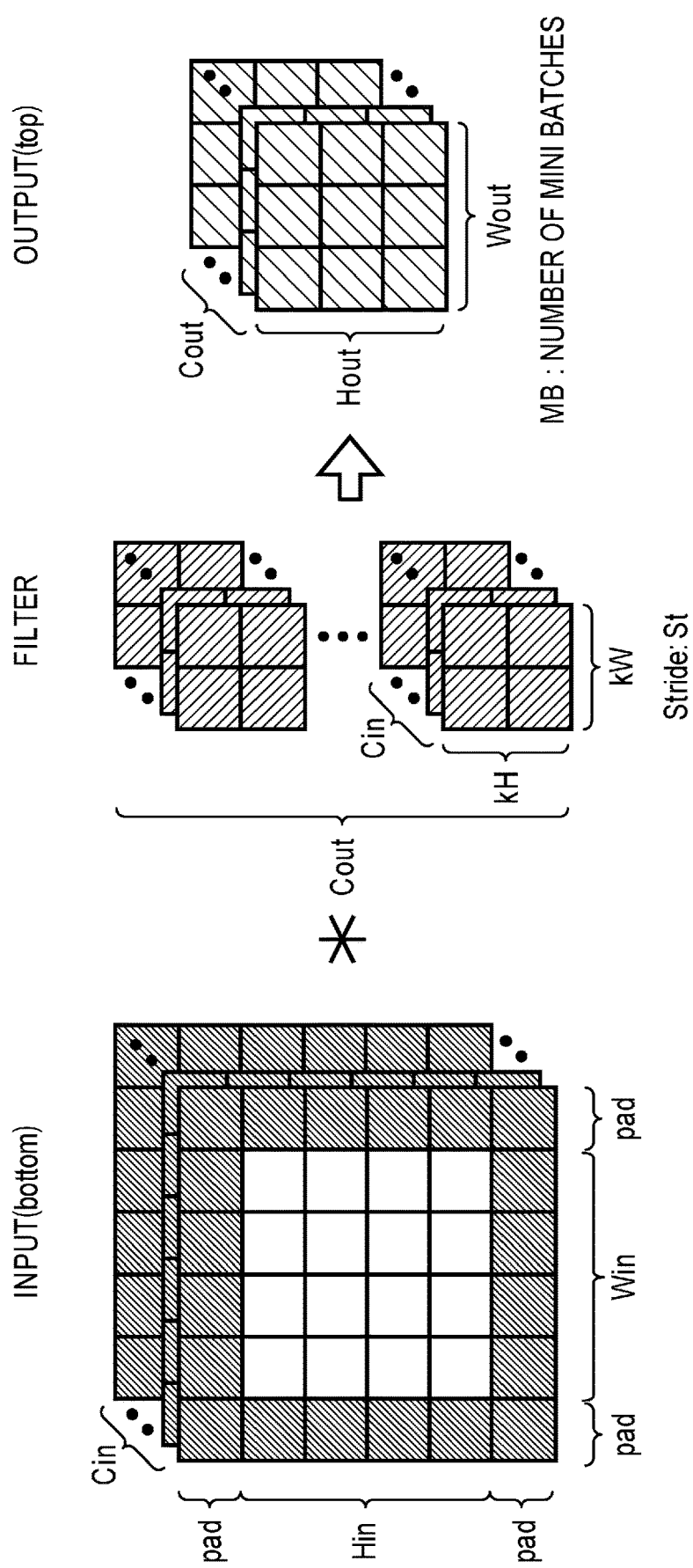
FIG. 16 describes of the operation of the convolution layer.

FIG. 16 describes of the operation of the convolution layer. An input INPUT having input images that are each $H_{in} \times W_{in}$ is input to the convolution layer by the number of the input channels $C_{in}$. The surroundings of the input image are padded with pixels having a width based on the filter size. The convolution layer performs convolution operation by moving filters FILTER that are each kH×kW (2×2) on the input images that are each Hm×Wtn at intervals of a stride St. Each filter FILTER has the same number of filter elements (kH×kW) as the input channels $C_{in}$ of the input images, and such filters FILTER are provided by the number of output channels $C_{out}$. The operation of the convolution layer performs convolution operation of the filters FILTER on the input images for the input channels $C_{in}$, and outputs OUTPUT having output images that are each $H_{out} \times W_{out}$ by the number of the filters $C_{out}$.

FIG. 17 is a table illustrating the operation content, the input image size, the amount of padding, the input channel number, the stride number, the output image size, the number of operations, the number of operation instructions of the operation circuit, the amount of data, and the like of the convolution layer. As illustrated in FIG. 17, the operation content of the convolution layer is to execute the operation of cumulatively adding a value ($w_{ij}*I(i)+bias$), which is calculated by multiplying elements I(i) of all input channels $C_{in}$ of the padded input images by a weight $w_{ij}$ of the filters of $kH \times kW \times C_{in}$ and adding a bias thereto, for the filters for all the output channels $C_{out}$.

As illustrated in FIG. 17, when the input image size is represented by $H_{in} \times W_{in}$, the amount of padding is represented by pad, the input channel number is represented by $C_{in}$, the filter image size is represented by $kH \times kW \times C_{in}$, the stride of the filter is represented by St, and the output image size is represented by $H_{out} \times W_{out} \times C_{out}$, the sizes $W_{out}$ and $H_{out}$ of the output images are as follows.

$$W_{out}=(W_{in}+2pad-kW)/St-1 \text{ or } W_{in}=W_{out} \times St+kW+St-2pad$$

$$H_{out}=(H_{in}+2pad-kH)/St-1 \text{ or } H=H_{out} \times St+kH+St-2pad$$

Therefore, the number of the operations for the product and the number of the operations for the sum of the convolution layer are as follows.

$$\text{number of operations(product)}=(H_{out} \times W_{out} \times C_{out}+Gr \times kH \times kW \times C_{in}+Gr) \times Gr \times MB$$

$$\text{number of operations(sum)}=\{(H_{out} \times W_{out} \times C_{out}+Gr \times kH \times kW \times Gn+Gr+H_{out} \times W_{out} \times C_{out}\} \times MB$$

Here, Gr represents the number of groups of the input INPUT and the output OUTPUT, and MB represents the amount of data in a mini batch. The convolution layer in the specific example separates the input channel $C_{in}$ and the output channel $C_{out}$ into the number of groups Gr and performs convolution operation in each group. Then, the convolution layer performs the convolution operation for only the number of groups Gr, and performs the operation above for the amount of mini batch data MB. As a result, the number of operations is reduced to 1/Gr times.

(1) The number of times common for the number of operations for the product and the number of operations for the sum described above is executed by the product-sum operation circuit, and (2) & (3) remainder of the number of operations for the product or the number of operations for the sum beyond the common number of times is executed by the product-sum operation circuit. As illustrated in FIG. 17, in this case, (1) the number of product-sum instructions of the product-sum operation circuit, (2) the number of addition instructions of the product-sum operation circuit, and (3) the number of multiplication instructions of the product-sum operation circuit in the NN processor are as follows.

$$\text{number of instructions (product sum)} = (H_{out} \times W_{out} \times C_{out} + Gr \times kH \times kW \times C_{in} \div Gr) \times Gr \times MB \quad (1)$$

$$\text{number of instructions (sum)} = (\text{number of operations (sum)}) - (\text{number of instructions (product sum)}) = \{H_{out} \times W_{out} \times C_{out}\} \times MB \quad (2)$$

$$\text{number of instructions (product)} = (\text{number of operations (product)}) - (\text{number of instructions (product sum)}) = 0 \quad (3)$$

From the expressions above, the operations of the convolution layer are all executed by the product-sum operation circuit, and do not include special operations.

Next, the amount of data of an input "bottom" an output "top", the bias "bias" and a weight "weight" are as follows.

$$\text{bottom} = H_{in} \times W_{in} \times C_{in} \times MB$$

$$\text{top} = H_{out} \times W_{out} \times C_{out} \times MB$$

$$\text{bias} = C_{out}$$

$$\text{weight} = kH \times kW \times C_{in} \div Gr \times C_{out} \div Gr \times$$

Max Pooling Layer

Figure 18:
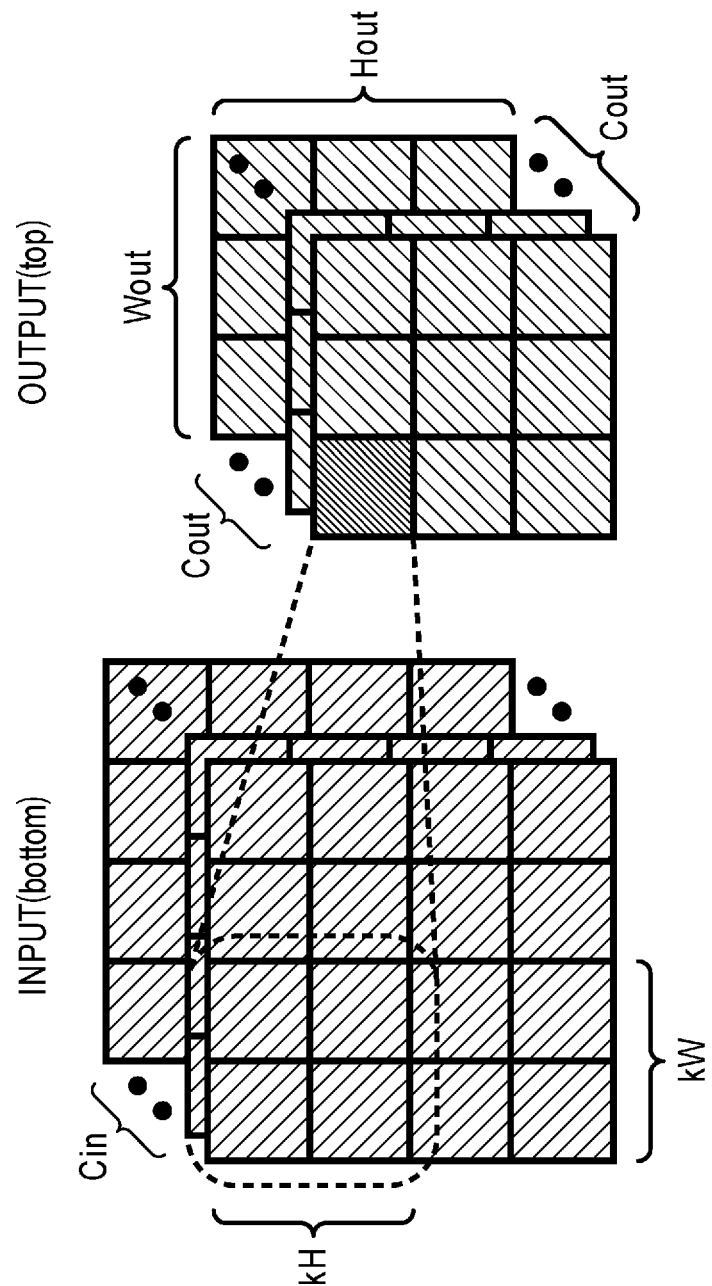
FIG. 18 describes the operation of the max pooling layer.

FIG. 18 describes the operation of the max pooling layer. In the specific example of FIG. 1, the max pooling layer input images obtained by normalizing the convolution operation result with the LRN layer or images obtained by convolution operation, and selects and outputs the maximum value of the neighboring pixels. In order to select the maximum value of the neighboring elements, the max pooling layer executes a number of kH*kW comparison operations (logical operations) for $H_{out}*W_{out}*C_{out}*MB$.

FIG. 19 is a table illustrating the operation content, the input size, the output size, the number of operations, the number of operation instructions of the operation circuit, the amount of data, and the like of the max pooling layer. The operation content is an operation of obtaining the maximum value of the inputs I(i) In the maximum value target size kH×kW of the input image by comparing a number of kH×kW inputs I(i) with each other.

When the maximum value target size is represented by kH×kW, the output image size is represented by $H_{out} \times W_{out} \times C_{out}$, and the amount of data of the mini batch is represented by MB, the number of operations of the comparison is $H_{out} \times W_{out} \times C_{out} \times (kH \times kW) \times MB$. The comparison operation is a logical operation, and is executed by the product-sum operation circuit. Thus, the number of instructions of the product-sum operation circuit is equal to the number of comparison operations. Therefore, the operation of the max pooling layer is executed by the product-sum operation circuit, and is not a special operation. The amount of data of the input bottom, the output top, and a variable mask is as illustrated in FIG. 19.

Activation Function ReLU Layer

Figure 20:
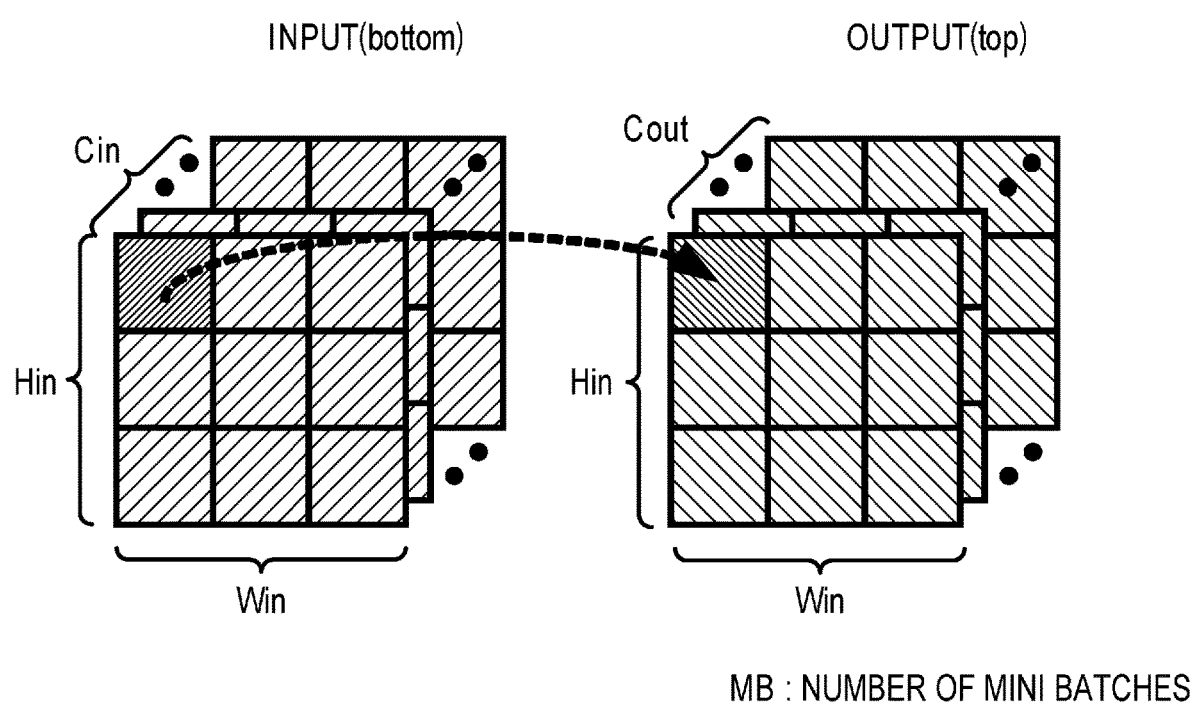
FIG. 20 describes the operation of the activation function ReLU layer.

FIG. 20 describes the operation of the activation function ReLU layer. The ReLU layer performs an operation of comparing whether the input data I(i) of $H_{in} \times W_{in} \times C_{in}$ is I(i)<0 or I(i)≥0, output output O(i)=0 when I(i)<0, and output output O(i)=I(i) when I(i)≥0.

FIG. 21 is a table illustrating the operation content, the input size, the output size, the number of operations, the number of operation instructions of the operation circuit, the amount of data, and the like of the activation function ReLU layer. The operation content is as described above. The input image size is $H_{in} \times W_{in} \times C_{in}$ and the output image size is $H_{out} \times W_{out} \times C_{out}$, and the two are equal in size. The amount of data of the mini batch is MB. The number of operations in this case is the number of comparison operations between the input I(i) and zero (0), and hence is $H_{in} \times W_{in} \times C_{in} \times MB$. The comparison operation can be executed by the logical operation circuit of the product-sum operation circuit, and hence the number of instructions of the product-sum operation circuit is equal to the number of operations (comparisons). Therefore, the activation function ReLU layer is executed by the product-sum operation circuit, and does not includes a special operation. The amounts of data of an input "borrow" and the output "top" are the same as the input image size and the output image size respectively.

Fully Connected Layer FC

Figure 22:
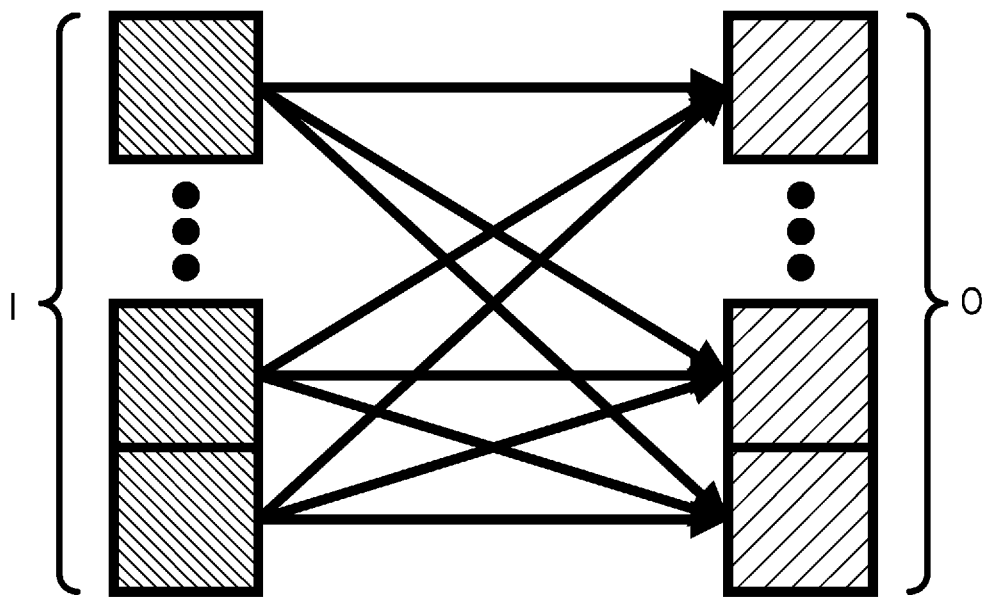
FIG. 22 describes the operation of the fully connected layer FC.

FIG. 22 describes the operation of the fully connected layer FC. The fully connected layer cumulates values obtained by multiplying the inputs I(i) with the size of $H_{in}*W_{in}*C_{in}$ in which all pixels (all neurons) of the input image are arranged by the weight $w_{ij}$, add the bias "bias" to the cumulated value to have a value O(i), and outputs the value O(i).

FIG. 23 is a table illustrating the operation content, the input size, the output size, the number of operations, the number of operation instructions of the operation circuit, the amount of data, and the like of the fully connected layer FC. The operation content is as described above. The input image size is $H_{in} \times W_{in} \times C_{in}$ and the output image size is $H_{out} \times W_{out} \times C_{out}$. The sizes are not necessarily equal to each other.

When the input size is represented by I, the output size is represented by O, and the amount of the mini batch data is represented by MB, the number of multiplication operations is I×O×MB and the number of addition operations is (I×O+O)×MB. The addition is the sum I×O+O of the number of times I×O of cumulatively adding the value obtained by multiplying all the inputs by the weight for each data of the mini batch, and the number of times O of adding the bias "bias" to the result of the cumulative addition. The addition is performed in each data of the mini batch, and hence the total number of additions is (I×O+O)×MB.

Next, the addition and the multiplication can be simultaneously executed in the product-sum operation circuit, and hence the common number of times for the number of addition operations and the number of multiplication operations is the number of product-sum operation instructions I×O×MB. The remainder obtained by subtracting the number of product-sum operation instructions from the number of addition operations is the number of addition operation instructions O×MB. The number of multiplication operation instructions is zero.

For the amount of data, the amount of data of the input "bottom" and the amount of data of the output "top" are the amount obtained by multiplying the input image size by the amount of data of the mini batch MB as illustrated in FIG. 23.

$$\text{bottom} = H_{in} \times W_{in} \times C_{in} \times MB$$

$$\text{top} = H_{out} \times W_{out} \times C_{out} \times MB$$

The amount of data of the bias "bias" Is provided for the number of the output channels $C_{out}$, and hence bias=$C_{out}$ is satisfied. The amount of data of the weight is (total input amount)×(total output amount), and hence weight=$H_{in} \times W_{in} \times C_{in} \times H_{out} \times W_{out} \times C_{out}$ is satisfied.

As described above, the operation of the fully connected layer is entirely executed by the product-sum operation circuit, and does not include a special operation.

Dropout Layer

Figure 24:
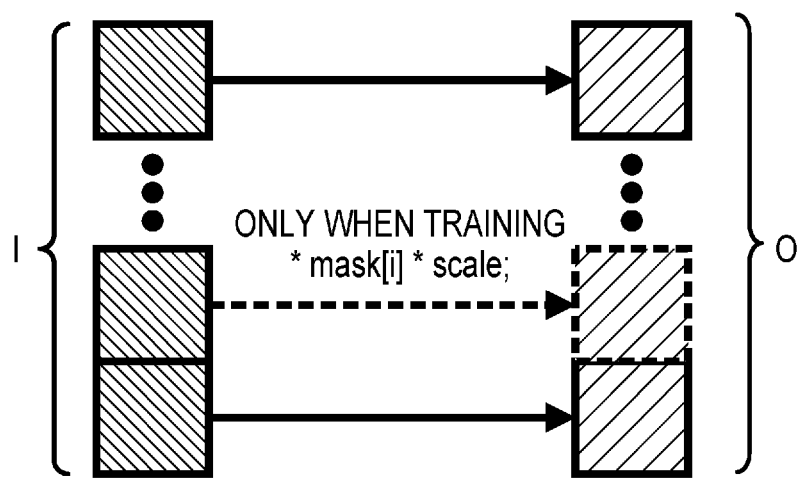
FIG. 24 describes the operation of the Dropout layer.

FIG. 24 describes the operation of the Dropout layer. As illustrated in FIG. 1, the Dropout layer inactivates randomly selected nodes out of the outputs of the fully connected layer FC, and strengthens the nodes that are not inactivated. The Dropout Layer is a method based on the knowledge of brain science. The Dropout Layer places a load on the network by inactivating the randomly selected nodes and strengthens the nodes that are not inactivated by multiplying the nodes that are not inactivated by a constant scale at the time of the learning. The operation of the Dropout layer is not performed at the time of the production (inference).

FIG. 25 is a table illustrating the operation content, the input size, the output size, the number of operations, the number of operation instructions of the operation circuit, the amount of data, and the like of the Dropout layer. The operation content is as described above, and operation expression is as follows.

$$O(i)=I(i)*\text{mask}(i)*\text{scale}$$

Mask (I) is a mask bit that indicates active "1" and inactive "0". The input image size is $H_{in} \times W_{in} \times C_{in}$, and the output image size is $H_{out} \times W_{out} \times C_{out}$. The amount of data of the mini batch is MB. The number of multiplication operations is $2 \times I \times MB$ because the input data is multiplied by the mask bit mask(i), and is further multiplied by a scale at the time of learning. The number of operations at the time of production is zero. The number of instructions of the multiplication operations at the time of the learning is equal to the number of multiplication operations, and is $2 \times I \times MB$.

The amount of data of the input "borrow", the output "top", and the mask bit "mask" is as follows.

$$\text{borrow}=H_{in} \times W_{in} \times C_{in} \times MB$$

$$\text{top}=H_{out} \times W_{out} \times C_{out} \times MB$$

$$\text{mask}=H_{in} \times W_{in} \times C_{in} \times MB$$

Therefore, the operation of the Dropout layer is entirely executed by the product-sum operation circuit, and does not include a special operation.

Softmax Layer

Figure 26:
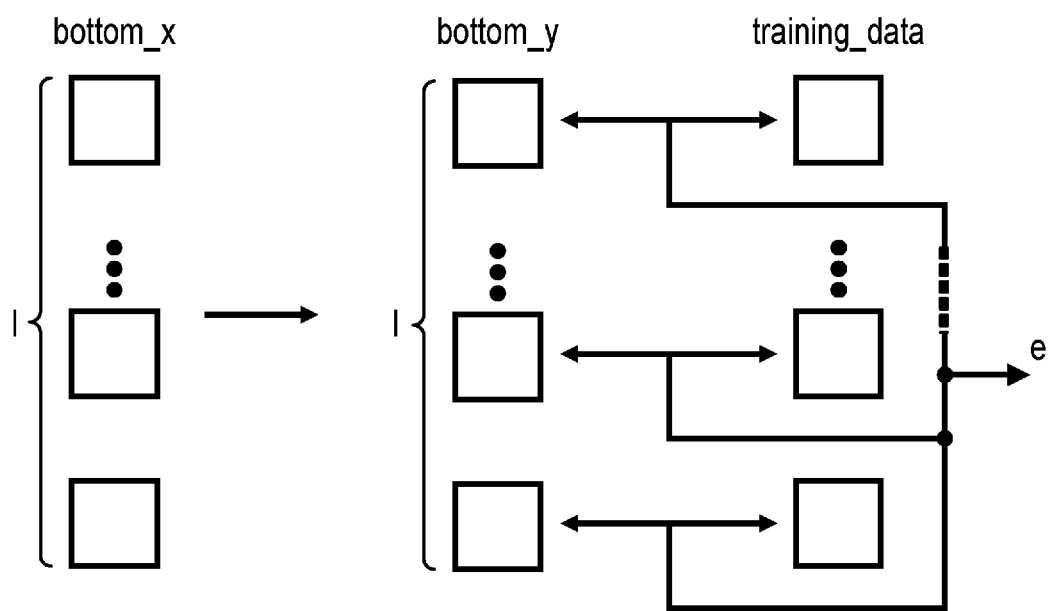
FIG. 26 describes the operation of the Softmax layer.

FIG. 26 describes the operation of the Softmax layer. The operation of the Softmax layer in FIG. 26 generates probabilities of which total is 1 for the node (neuron) of each output, and obtains the error (cross entropy error) of the output of each node used in the propagation in the opposite direction.

FIG. 27 is a table illustrating the operation content, the input size, the output size, the number of operations, the number of operation instructions of the operation circuit, the amount of data, and the like of the Softmax layer. FIG. 28 illustrates the source code of the operation of the Softmax layer. The source code of AlexNet can be extracted from open source.

The operation content of the Softmax layer is as follows as illustrated in the operation content in FIG. 27 and the source code in FIG. 28.

(1) Output a maximum value "scale" of an input bottom_x with a function max. The function max is the comparison operation.

(2) Subtract the maximum value "scale" from each of all inputs "bottom_y", and cause (all inputs x)−(maximum value max) to be negative.

(3) Obtain exp of x-max (<0), and set the range thereof to be 0 to 1.0.

(4) Obtain a sum "scale" of all $e^{x-max}$.

(5) Divide each $e^{x-max}$ by the sum "scale" of all $e^{x-max}$, and obtain (the probabilities of which sum is 1)=$e^{x-max}$/(the sum "scale" of all $e^{x-max}$).

(6) When the correct answer vector t[mb][i]=1 is satisfied, obtain $\log(e^{x-max}/\Sigma e^{x-max})$ (cross entropy error) that is the log of the probabilities described above. The $\log(e^{x-max}/\Sigma e^{x-max})$ is negative, and hence obtain a positive error "e" by multiplying the $\log(e^{x-max}/\Sigma e^{x-max})$ by (−1) times.

The Input size and the output size of the Softmax layer are as follows.

$$I=H_{in} \times W_{in} \times C$$

$$O=H_{out} \times W_{out} \times C_{out}$$

When the amount of data of the mini batch is MB, the number of operations for the comparison, the difference, exp, the sum, the quotient, and log of the operations (1) to (6) described above are as follows. The input size is represented by I, and the amount of data of the mini batch is represented by MB.

$$\text{number of operations (comparison)}=I \times MB \times 2$$

$$\text{number of operations (difference)}=I \times MB \times 2$$

$$\text{number of operations (exp)}=I \times MB$$

$$\text{number of operations (sum)}=I \times MB$$

$$\text{number of operations (quotient)}=I \times MB$$

$$\text{number of operations (log)}=I \times MB$$

Out of the operations, the product-sum operation circuit executes the operations for the comparison, the difference, and the sum, and the special operation circuit executes the operations for exp, the quotient, and log. The number of the operation instructions is the same as the number of operations. As described above, the Softmax layer executes non-special operations by the product-sum operation circuit and executes special operations by the special operation circuit.

For the amount of data, the input bottom, and the output top corresponding to the error e are as follows.

$$\text{bottom}=H_{in} \times W_{in} \times C_{in} \times MB$$

$$\text{top}=H_{out} \times W_{out} \times C_{out} \times MB \text{ (only for the learning, zero at the time of production)}$$

LRN Layer FIG. 29 describes the operation of the LRN layer. As illustrated in FIG. 1, the LRN layer is provided on the output side of the convolution layer CONV, and normalizes a local amount of pixel data in the channel direction of the image data generated by the convolution layer.

FIG. 30 illustrates a source code of the operation of the LRN layer. FIG. 31 and FIG. 32 are tables illustrating the operation content, the input size, the output size, the number of operations, the number of operation instructions of the operation circuit, the amount of data, and the like of the LRN layer.

The operation content of the LRN layer is as follows as illustrated in the source code in FIG. 30 and the operation content in FIG. 31.

(1) Obtain the square $X^2$ of the input X (bottom_data) of the LRN layer that is the output of the convolution layer CONV for the elements of $H_{in}*W_{in}*C_{in}$. The square $X^2$ becomes a variable padded_square. The operation is the product operation.

(2) Multiply each of the elements of Local_size=n in the channel C of Padded_square by a and divide each of the elements by Local_size=n (multiply by α/n), to thereby obtain the mean scale_data[cin] (=scale_data[mb][0][i], mean of $C_{in}$=0) for the local number Local_size in the channel direction of the elements $X^2$ of padded_square. The operation is the product operation and the sum operation.

(3) Obtain the mean for the remaining c=1 to $C_{in}$ while moving within the channel $C_{in}$. Specifically, obtain the mean of c=1 by subtracting a tail tail of the mean (scale_data[mb] [c−1][i]) obtained for c=0 in operation (2) from the mean and adding a head thereto. Repeat the same for c=2 and thereafter. The mean is the movement mean of the elements of Local_size=n. The operation is the sum operation, two product operations, and the difference operation.

(4) Obtain the output top_data[i] by raising the output in operation (3) to the power of −¾. Obtain the output top_data [i] for i=$C_{in}*H_{in}*W_{in}$. The operation here is the operation for the power pow, and is a special operation.

(5) Multiply the output top_data[i] in operation (4) by the input bottom_data[i]. The operation here is the product operation.

The input image size I and output image size O are as follows.

$I=H_{in} \times W_{in} \times C_{in}$ ($C_{in}$ is the number of input channels)

$O=H_{out} \times W_{out} \times C_{out}$ ($C_{out}$ is the number of output channels)

The amount of data of the mini batch is MB.

Next, for the number of operations, the number of times of the operations (1) to (5) described above and the number of times of the same operations put together are as follows.

product: $C_{in} \times H_{in} \times W_{in}$ (1)

product: local_size×$H_{in} \times W_{in}$, sum: local_size×$H_{in} \times W_{in}$ (2)

product: $(C_{in}-1) \times H_{in} \times W_{in} \times 2$, sum: $(C_{in}-1) \times H_{in} \times W_{in}$, difference: $(C_{in}-1) \times H_{in} \times W_{in}$ (3)

power: $C_{in} \times H_{in} \times W_{in}$ (4)

product: $C_{in} \times H_{in} \times W_{in}$ (5)

Therefore, number of operations(product): $(4C_{in}+\text{local\_size}-2) \times W_{in} \times H_{in} \times MB$ number of operations(sum): $(C_{in}+\text{local\_size}-1) \times W_{in} \times H_{in} \times MB$ number of operations(difference): $(C_{in}-1) \times W_{in} \times H_{in} \times MB$ number of operations (Pow): $C_{in} \times W_{in} \times H_{in} \times MB$ Next, the number of instructions of the operations is as follows when the product and the sum, and the product and the difference are put together.

number of instructions (product sum): {local_size× $W_{in} \times H_{in}+(C_{in}-1) \times W_{in} \times H_{in}$}×MB number of instructions (product difference): $(C_{in}-1) \times W_{in} \times H_{in} \times MB$ number of instructions (sum): (number of operations (sum))−(number of instructions (product sum)=0 number of instructions (difference): (number of operations (difference))−(number of instructions (product difference))=0 number of instructions (product): (number of operations (product))−(number of instructions (product sum))−(number of instructions (product difference))=$C_{in} \times W_{in} \times H_{in} \times MB \times 4$ number of instructions (pow): number of operations (pow)=$C_{in} \times W_{in} \times H_{in} \times M$ The amount of data is as follows.

bottom=$H_{in} \times W_{in} \times C_{in} \times MB$ top=$H_{out} \times W_{out} \times C_{out} \times MB$ scale=$H_{in} \times W_{in} \times C_{in} \times MB$ padded square=$W_{in} \times H_{in} \times C_{in}$ As described above, in the operation of the LRN layer, the product-sum operation circuit executes the non-special operation, and the special operation circuit executes the special operation (raising to a power).

Bach Normalization Layer

FIG. 33 illustrates the operation expressions of the operation content of the batch normalization layer. FIG. 34 and FIG. 35 are tables illustrating the operation content, the input size, the output size, the number of operations, the number of operation instructions of the operation circuit, the amount of data, and the like of the batch normalization layer.

The batch normalization layer is provided after the convolution layer, for example, and normalizes all the output images obtained by operating all the input images of the mini batch for each channel $C_{out}$. The input of the batch normalization layer is the output images for the data of the mini batches operated in the convolution layer, and the output thereof is the normalized output images.

The operation of the batch normalization layer is as follows as also illustrated in the operation content in FIG. 34.

(1) Execute the mean, the variance, the normalization, and the scale and the shift of the output images of the channels Ci calculated in the mini batches (MB).

(2) Repeat the operation of (mean of channels CI calculated in current MB)+(mean of channels Ci calculated in previous MB)*(coefficient)=(movement mean) for all the channels $C_0$ to $C_n$.

(3) Repeat the operation of (variance of channels Ci calculated by current MB)*(coefficient)+(variance of channels Ci calculated by previous MB)*(coefficient)=(movement mean) for all the channels $C_0$ to $C_n$.

In operations (2) and (3), in each MB, multiplication*three times, and addition*two times are executed for the number of channels $C_{in}$. The movement mean of operations (2) and (3) are operations that are obtained in advance in the learning step for the production step.

FIG. 33 illustrates the operation expressions of the mean, the variance, the normalization, and the scale and the shift of the output images of the channels Ci described above. The number of operations for the square root and the division can be reduced by separating the operation of the normalization into an operation expression for obtaining t[ci], and an operation expression for obtaining the normalized value temp[bi][ci][x][y]. The scale and shift operation is an operation for linearly transforming the normalized value temp[bi][ci][x][y] into 0 to 255.

In FIG. 34, the input image size and the output image size are as follows.

$$\text{Bottom} = H_{in} \times W_{in} \times C_{in} \times MB$$

$$\text{top} = H_{out} \times W_{out} \times C_{out} \times MB$$

Here, MB represents the data amount of the mini batch.

Thus, according to the operation expressions in FIG. 33, the number of operations of the mean, the variance, the movement mean, the normalization, and the scale and the shift is as illustrated in FIG. 34.

mean:

(number of operations (product))=(number of operations (sum))=$H_{in} \times W_{in} \times C_{in} \times MB$ variance:

number of operations (difference)=$H_{in} \times W_{in} \times C_{in} \times MB$ number of operations (product)=$2 \times H_{in} \times W_{in} \times C_{in} \times MB$ number of operations (sum)=$H_{in} \times W_{in} \times C_{in} \times MB$ movement mean:

number of operations (product)=$3 \times C_{in}$ number of operations (sum)=$2 \times C_{in}$ normalization:

number of operations (sum)=$C_{in}$ number of operations (square root)=$C_{in}$ number of operations (quotient)=$H_{in} \times W_{in} \times C_{in} \times MB$ scale and shift:

number of operations (product)=$H_{in} \times W_{in} \times C_{in} \times MB$ number of operations (sum)=$H_{in} \times W_{in} \times C_{in} \times MB$ The number of instructions of the operations for the product sum, the product, the sum, the difference, the quotient, and the square root of the mean, the variance, the movement mean, the normalization, and the scale and shift is as illustrated in FIG. 35. The product and the sum, and the product and the difference can be operated together by the product-sum operation, and hence are put together as the number of instructions of the product-sum operation.

mean:

number of instructions (product sum)=$H_{in} \times W_{in} \times C_{in} \times MB$ variance:

number of instructions (difference)=$H_{in} \times W_{in} \times C_{in} \times MB$ number of instructions (product)=$H_{in} \times W_{in} \times C_{in} \times MB$ number of instructions (product sum)=$H_{in} \times W_{in} \times C_{in} \times MB$ movement mean:

number of instructions (product)=$C_{in}$ number of instructions (product sum)=$2 \times C_{in}$ normalization:

number of instructions (sum)=$C_{in}$ number of instructions (square root)=$C_{in}$ number of instructions (quotient)=$H_{in} \times W_{in} \times C_{in} \times MB$ scale and shift:

(number of instructions (product sum))=(number of operations (product)=$H_{in} \times W_{in} \times C_{in} \times MB$ The amount of data is as illustrated in FIG. 35.

bottom=$H_{in} \times W_{in} \times C_{in} \times MB$ top=$H_{out} \times W_{out} \times C_{out} \times MB$ deviation=$C_{in}$ bias ($\beta$)=$C_{out}$ bias ($\gamma$)=$C_{out}$ As described above, the batch normalization layer performs the non-special operation by the product-sum operation circuit, and performs special operations of the quotient and the square root by the special operation circuit.

LSTM Layer

The special operation of the LSTM layer is the operation of a sigmoid function and the operation of a tanh function. Specific examples of the above are omitted.

9. Selection Method Based on Specific Examples

Next, the determination on whether to execute the special operation by the special operation circuit or to execute the special operation with the approximate calculation by the product-sum operation circuit, and the selection of the approximate calculation executed by the product-sum operation circuit are described on the basis of specific examples. The specific examples are the LRN layer and the batch normalization layer including a special operation.

Specific Example of LRN Layer

The table for the special operation and the approximate calculation of the LRN layer illustrated in FIG. 11 and FIG. 12 will be explained, and the determination and the selection described above for when the operation of the LRN layer is executed by the NN processor having a certain performance illustrated in FIG. 13 to FIG. 15 will be explained.

FIG. 36 illustrates a table for the special operation (power of −¾) and the approximate calculations of the LRN layer. The table illustrates Original executed by the special operation circuit, and four examples in which approximate calculation is executed by the product-sum operation circuit as calculate methods of the special operation (power of −¾). The four approximate calculations are (1) only initial value estimation (estimation of a magic number), (2) the initial value estimation and two rotations of the third order Householder method, (3) the initial value estimation and four rotations of the Newton's method, and (4) the initial value estimation, the third order Householder method, and the fourth order Householder method. The table illustrates the number of instructions in the initial value estimation, the number of instructions in the convergent operation, the total number of instructions, the number of clock cycles, and the error for the execution by the special operation circuit and the four approximate calculations.

First, for the case where the special operation circuit executes the special operation, (number of instructions)=(two instructions for operation fsqrt of √x)+(one instruction for multiplication fmul)+(one instruction for division fdiv) as illustrated in the column of the convergent operation (number of instructions). In other words, the operation of (power of −¾) includes (1) calculating a square root two times (power of ¼), (2) multiplying a value obtained by the calculating a square root two times (power of ¼) and a value obtained by calculating a square root one time (power of 2/4), i.e. ((power of ¼)+(power of 2/4)=(power of ¾)), and (3) taking the reciprocal of the multiplied value (power of −¾). The special operation circuit executes fsqrt two times and fdiv one time, and the product-sum operation circuit executes fmul one time. Each of fsqrt, fmul, and fdiv is an instruction of a floating point number operation circuit. Therefore, the total number of instructions is one for the number of product-sum operation instructions, and three for the number of special operation instructions (the number of instructions for fsqrt is two and the number of instructions for fdiv is one). When the mean number of the clock cycles necessary for the execution of one instruction of the NN processor is 1 cycle for the product-sum operation circuit, 23 cycles for fsqrt, and 22 cycles for fdiv, the total number of clock cycles is 1 cycle for the product-sum operation circuit and 68 cycles for the special operation circuit. The error (−1) substantially means zero.

Secondly, four cases of executing the special operation with the approximate calculation by the product-sum operation circuit are described.

(1) The operation of only the initial value settings includes two instructions of the right logical shift isrl, and two instructions of the subtraction isub, as a result of an experiment. The instructions isrl and isub are instructions of a fixed point operation circuit. The operations of those instructions can be executed by the product-sum operation circuit, and the total number of instructions is four of product-sum operation instructions. Therefore, the total number of clock cycles is four.

(2) In the operation of the initial value estimation and two rotations of the third order Householder method, the number of instructions for the initial value estimation is four, which is the same as above, and the number of instructions for the convergent operation is (5*2 instructions for product-sum operation fma)+(5*2 instructions for multiplication fmu). Therefore, the total number of instructions is 24 product-sum operation instructions. Therefore, the total clock cycle is 24*1=24. The error is 19.53.

(3) In the operation of the initial value estimation and four rotations of the Newton's method, the number of instructions for the initial value estimation is four, which is the same as above, and the number of instructions for the convergent operation is (2*4 Instructions for product-sum operation fma)+(6*4 Instructions for multiplication fmu). Therefore, the total number of instructions is 36 product-sum operation instructions. Therefore, the total cock cycle is 36*1=36. The error is 0.95.

(4) In the operation of the initial value estimation, the third order Householder method, and the fourth order Householder method, the number of instructions for the initial value estimation is four, which is the same as above, and the number of instructions for the convergent operation is (5+5 instructions for product-sum operation fma)+(5+7 Instructions for multiplication fmu). Therefore, the total number of instructions is 26 product-sum operation instructions. Therefore, the total clock cycle is 36*1=36. The error is 0.87.

FIG. 37 is a flow chart illustrating a specific example of the comparison between the operation time including the special operation in the LRN layer and the memory transfer time, and the selection of the approximate calculation. First, the number of operation instructions $X_{ma}+X_s$ of the LRN layer and the memory transfer amount y are as follows (S80).

$X_{ma}+X_s$=1,200,000,000 (product sum)+300,000,000 (special)

$y$=300,000,000*4 [byte]

The number of operation instructions $X_{ma}$ Includes the number of instructions executed by the product-sum operation circuit for non-special operations for LRN layer. The number of operation instructions $X_s$ includes the number of instructions executed by the special operation circuit (fsqrt and fdiv) and the product-sum operation circuit (fmul) for special operations for LRN layer.

The performance of the NN processor is as follows (S81).

product-sum operation performance: $n_{ma}$=2,000 GFLOPS, special operation performance: $n_s$=125 GFLOPS memory transfer performance (memory bandwidth): $m$=200 GB/s Thus, time $t_{cma}$ for executing the non-special operation and a part of the special operation in the operation of the LRN layer by the product-sum operation circuit and time $t_{cs}$ for executing the remainder of the special operation by the special operation circuit are $t_{cma}+t_{cs}$=163,950 μsec as illustrated in FIG. 37. In the formula of $t_{cma}+t_{cs}$, the number of cycles of the product-sum operation circuit (fmul) for the non-special operation is 1 cycle, the number of cycles of the product-sum operation circuit (fmul) for the special operation is also 1 cycle, and the total number of cycles of the special operation circuit (fsqrt and fdiv) in the special operation is 68 cycles.

Meanwhile, the memory transfer time $t_m$ is $t_m$=18,000 μsec because the memory transfer amount y is 300,000,000*4 [byte] for each of the input "bottom", the variable "scale_data", and the output "top" as illustrated in FIG. 37. As a result, $t_{cma}+t_{cs} \le t_m$ is not satisfied, and the execution with the approximate calculation by the product-sum operation circuit is selected (S82).

In the selecting processing for the approximate calculation, when operation time $t_{cma}+t_{ca}$ for when the product-sum operation circuit executes the operation by the approximate method on the bottom row "Magic number+third order Householder method+fourth order Householder method" of the table in FIG. 36 of which error is the smallest is calculated first, the operation time is $t_{cma}+t_{ca}$=3,900 μsec as illustrated in FIG. 37. As a result, $t_{cma}+t_{ca} \le t_m$ is satisfied, and the approximate method on the bottom row is selected.

Specific Example of Batch Normalization Layer

FIG. 38 illustrates a table of the special operation (power of −½) and the approximate calculations of the batch normalization layer. First, for the case where the special operation circuit executes the special operation, (number of instructions)=(one instruction for operation fsqrt of √x)+ (one instruction for division fdiv) as illustrated in the column of the convergent operation (number of instructions). In other words, the operation of (power of −½) includes (1) calculating a square root one time (power of ½), and (2) taking the reciprocal of the square rooted value (power of −½). The operation of (power of −½) does not include the instruction for operation fmul executed by the product-sum operation circuit. The approximate calculations in FIG. 38 are different from FIG. 36 not only in Magic number but also in Householder method. Subtraction fsub is the instruction of the floating point number operation circuit. The number of instructions for the initial value estimation, the number of instructions for the convergent operation, the total number of instructions, the number of clock cycles necessary for the total number of instructions, and the error for the operation by the special operation circuit and the four types of approximate calculations are as illustrated in FIG. 38, and the descriptions thereof are omitted.

Figure 39:
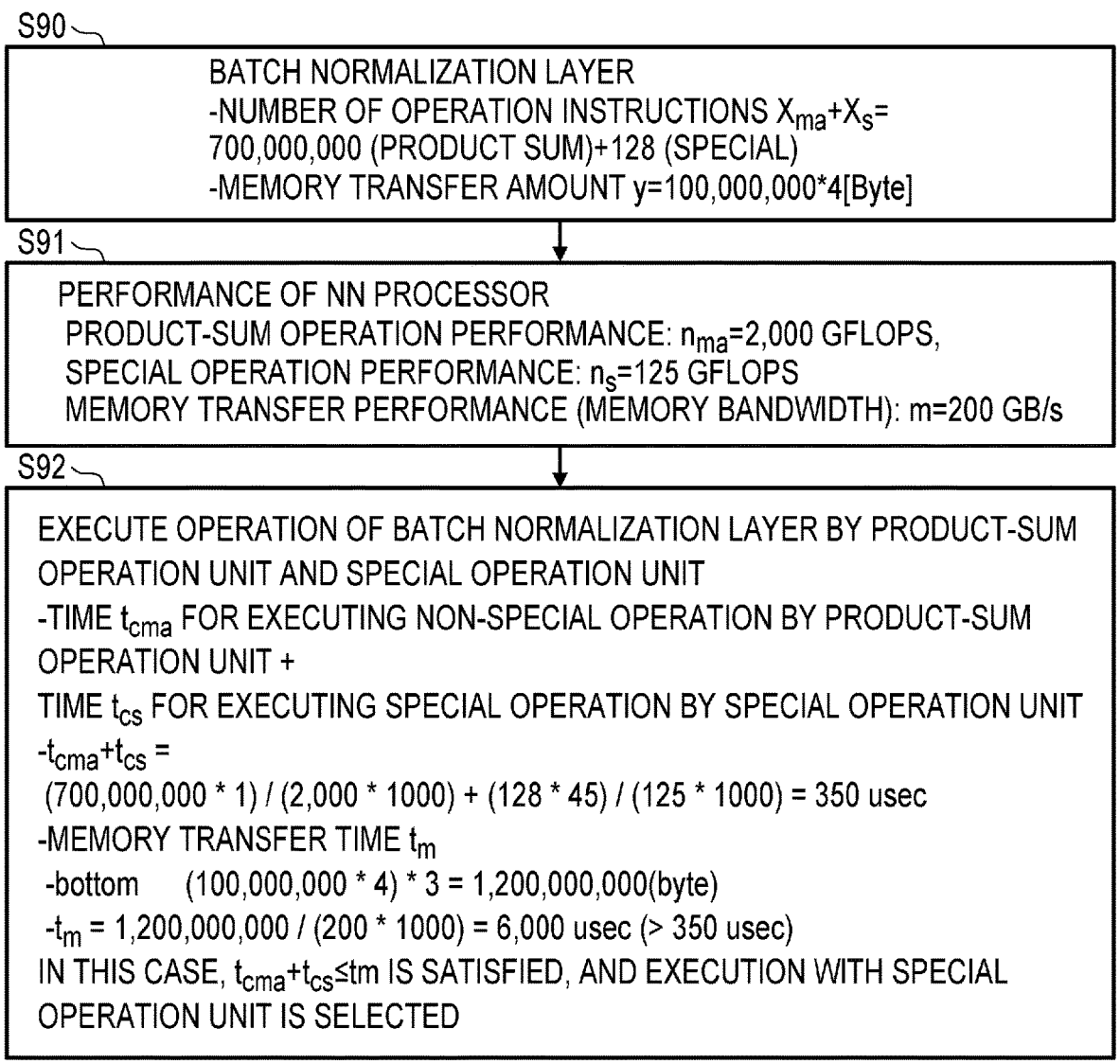
FIG. 39 is a flow chart illustrating a specific example of the comparison between the operation time including the special operation in the batch normalization layer and the memory transfer time, and the selection of the approximate calculation.

FIG. 39 is a flow chart illustrating a specific example of the comparison between the operation time including the special operation in the batch normalization layer and the memory transfer time, and the selection of the approximate calculation. The number of operation instructions $X_{ma}+X_s$ of the batch normalization layer and the memory transfer amount y are as indicated in step S90. The performance of the NN processor in step S91 is the same as that in FIG. 37.

Time $t_{cma}$ for executing the non-special operation by the product-sum operation circuit and time $t_{cs}$ for executing the special operation by the special operation circuit in the operations of the batch normalization layer is $t_{cma}+t_{cs}=350$ μsec as illustrated in FIG. 39 because the total number of cycles of the special operation is 45 cycles.

Meanwhile, the memory transfer time $t_m$ is $t_m=6,000$ μsec ($>t_{cma}+t_{cs}=350$ μsec) as in the drawings, and execution with the special operation circuit is selected. Note that the memory transfer amount y=100,000,000*4 is tripled for "bottom" of the memory transfer time tm because three types of data, that is, the input "bottom", the intermediate data "scale_data", and the output "top" are provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An information processing apparatus, comprising:
   a memory;
   a processor, connected to the memory, that includes
      a first operation circuit that configured to execute at least a multiplication operation, an addition operation, a logical operation, and a product-sum operation,
      a second operation circuit that configured to execute a certain operation different from the multiplication operation, the addition operation, the logical operation, and the product-sum operation; and
      a resister, wherein
   the processor configured to
      execute a first operation in a first layer in a neural network including a plurality of layers, the first operation including the certain operation,
      execute the first operation by a second method of calculating the certain operation of the first operation by the second operation circuit, in a case where second operation time necessary for the first operation when the certain operation of the first operation is executed by the second operation circuit is equal to or less than memory transfer time necessary for memory transfer between the memory and the resister for the first operation, and
      execute the first operation by a first method of calculating the certain operation of the first operation by an approximate calculation by the first operation circuit, in a case where first operation time necessary for the first operation when the first operation is executed by the first method is equal to or less than the memory transfer time, when the second operation time is not equal to or less than the memory transfer time.

2. The information processing apparatus according to claim 1, wherein:
   the approximate calculation in the first method includes a plurality of approximate calculations; and
   the executing the first operation by the first method includes
   executing the first operation by the first method with an approximate calculation of which error of the approximate calculation is minimum out of the plurality of approximate calculations with which the first operation time is equal to or lower than the memory transfer time.

3. The information processing apparatus according to claim 1, wherein:
   the processor configured to
   determine whether the second operation time is equal to or less than the memory transfer time,
   when the determination is true,
   determine that the first operation is to be executed by the second method, and
   when the determination is false,
   select an approximate calculation of which error of the approximate calculation is minimum out of the plurality of approximate calculations with which the first operation time is equal to or less than the memory transfer time, and
   determine that the first operation is to be executed by the first method with the selected approximate calculation.

4. The information processing apparatus according to claim 3, wherein the processor configured to, in a learning of the neural network:
   determine whether the certain operation is to be executed by the first method or the second method, and executes the first operation by the determined first method or second method in an initial learning of the learning; and
   execute the first operation by the first method or the second method determined in the initial learning in a repeated learning step after the initial learning.

5. The information processing apparatus according to claim 1, wherein:
   the second operation time is a sum of
   fourth operation time necessary for a number of times of instruction executions of the first operation circuit for executing a non-certain operation other than the certain operation included in the first operation and
   third operation time necessary for a number of times of instruction executions of the second operation circuit for executing the certain operation included in the first operation; and
   the first operation time is a sum of
   the fourth operation time necessary for the number of times of the instruction executions of the first operation circuit for executing the non-certain operation other than the certain operation included in the first operation and
   approximate calculation time necessary for a number of times of instruction executions of the first operation circuit for executing the approximate calculation for the certain operation included in the first operation.

6. The information processing apparatus according to claim 5, wherein the first operation time and the second operation time are values each obtained by multiplying the number of times of the instruction executions by a mean number of clock cycles necessary for executing one instruction by the first operation circuit or the second operation circuit and dividing the multiplied value by a total number of clock cycles of the first operation circuit or the second operation circuit that execute the operation per unit time.

7. The information processing apparatus according to claim 1, wherein a number of the first operation circuit in plurality is higher than a number of the second operation circuit.

8. An non-transitory computer readable storage medium that includes therein an neural network program causing a processor to execute a process of the neural network, the process comprising:

the processor, connected to a memory, including a first operation circuit that configured to execute at least a multiplication operation and an addition operation, a logical operation, and a product-sum operation, a second operation circuit that configured to execute a certain operation different from the multiplication operation and the addition operation, the logical operation, and the product-sum operation, and a resister, executing a first operation in a first layer in the neural network including a plurality of layers, the first operation including the certain operation, wherein the executing the first operation includes, executing the first operation by a second method of calculating the certain operation of the first operation by the second operation circuit, in a case where second operation time necessary for the first operation when the certain operation of the first operation is executed by the second operation circuit is equal to or less than memory transfer time necessary for memory transfer between the memory and the resister for the first operation; or executing the first operation by a first method of calculating the certain operation of the first operation by an approximate calculation by the first operation circuit, in a case where first operation time necessary for the first operation when the first operation is executed by the first method is equal to or less than the memory transfer time, when the second operation time is not equal to or less than the memory transfer time.

9. A processing method for neural network, the processing method comprising:

the processor, connected to a memory, including a first operation circuit that configured to execute at least a multiplication operation and an addition operation, a logical operation, and a product-sum operation, a second operation circuit that configured to execute a certain operation different from the multiplication operation, the addition operation, the logical operation, and the product-sum operation, and a resister, executing a first operation in a first layer in the neural network including a plurality of layers, the first operation including the certain operation, wherein the executing the first operation includes, executing the first operation by a second method of calculating the certain operation of the first operation by the second operation circuit, in a case where second operation time necessary for the first operation when the certain operation of the first operation is executed by the second operation circuit is equal to or less than memory transfer time necessary for memory transfer between the memory and the resister for the first operation; or executing the first operation by a first method of calculating the certain operation of the first operation by an approximate calculation by the first operation circuit, in a case where first operation time necessary for the first operation when the first operation is executed by the first method is equal to or less than the memory transfer time, when the second operation time is not equal to or less than the memory transfer time.

\* \* \* \* \*